(12) United States Patent
Katsuyama et al.

(10) Patent No.: US 11,895,442 B2
(45) Date of Patent: Feb. 6, 2024

(54) LIGHT BEAM EMISSION DEVICE AND LIGHT BEAM PROJECTION DEVICE EQUIPPED THEREWITH

(71) Applicant: University of Fukui, Fukui (JP)

(72) Inventors: Toshio Katsuyama, Fukui (JP); Shoji Yamada, Fukui (JP); Akira Nakao, Fukui (JP)

(73) Assignee: UNIVERSITY OF FUKUI, Fukui (JP)

( * ) Notice: Subject to any disclaimer, the term of this patent is extended or adjusted under 35 U.S.C. 154(b) by 293 days.

(21) Appl. No.: 17/469,082

(22) Filed: Sep. 8, 2021

(65) Prior Publication Data

US 2022/0021854 A1 Jan. 20, 2022

Related U.S. Application Data

(63) Continuation of application No. PCT/JP2020/049252, filed on Dec. 28, 2020.

(30) Foreign Application Priority Data

Mar. 30, 2020 (JP) ................................ 2020-061038

(51) Int. Cl.
*H04N 9/31* (2006.01)
*F21V 5/04* (2006.01)
(Continued)

(52) U.S. Cl.
CPC ............. *H04N 9/3129* (2013.01); *F21V 5/04* (2013.01); *H04N 9/3152* (2013.01);
(Continued)

(58) Field of Classification Search
None
See application file for complete search history.

(56) References Cited

U.S. PATENT DOCUMENTS

| 4,474,422 A | 10/1984 | Kitamura |
| 2002/0196377 A1 | 12/2002 | Furukawa et al. |

(Continued)

FOREIGN PATENT DOCUMENTS

| EP | 2 977 808 B1 | 7/2017 |
| EP | 3 054 676 B1 | 4/2019 |

(Continued)

OTHER PUBLICATIONS

International Search Report dated Mar. 16, 2021, issued in counterpart International Application No. PCT/JP2020/049252, w/English translation (4 pages).

*Primary Examiner* — Bao-Luan Q Le
*Assistant Examiner* — Danell L Owens
(74) *Attorney, Agent, or Firm* — WHDA, LLP

(57) ABSTRACT

Provided is a light beam emission device and a light beam projection device, that are downsizable, have a simple configuration, and simplify complicated processing of video signals, such as the timing adjustment of video output signals, without generating color irregularity. The devices include: a plurality of light sources; and a condensing member. A range in the light source array direction, in which emission spots of the light beams emitted from the plurality of light sources respectively exist, is within a size in the array direction of a light beam, immediately after the light beam emitted from an emission spot located most closely to the center of the plurality of light sources, with respect to the condensing member, passed through the condensing member.

18 Claims, 26 Drawing Sheets

(51) Int. Cl.
    *F21Y 115/00*    (2016.01)
    *F21Y 113/10*    (2016.01)

(52) U.S. Cl.
    CPC ........ *H04N 9/3161* (2013.01); *F21Y 2113/10* (2016.08); *F21Y 2115/00* (2016.08)

(56) References Cited

U.S. PATENT DOCUMENTS

| | | | |
|---|---|---|---|
| 2003/0011751 | A1 | 1/2003 | Sakata et al. |
| 2006/0120075 | A1 | 6/2006 | Takeda |
| 2009/0262307 | A1* | 10/2009 | Bartlett ................ H04N 9/3117 353/121 |
| 2018/0192018 | A1 | 7/2018 | Nakamura |
| 2019/0198560 | A1* | 6/2019 | Kaseya ................ H01L 33/007 |

FOREIGN PATENT DOCUMENTS

| | | | |
|---|---|---|---|
| JP | 56-69610 | A | 6/1981 |
| JP | 2001-264660 | A | 9/2001 |
| JP | 2002-350757 | A | 12/2002 |
| JP | 2003-21800 | A | 1/2003 |
| JP | 2006-162731 | A | 6/2006 |
| JP | 5817022 | B2 | 11/2015 |
| JP | 2017-9758 | A | 1/2017 |

\* cited by examiner

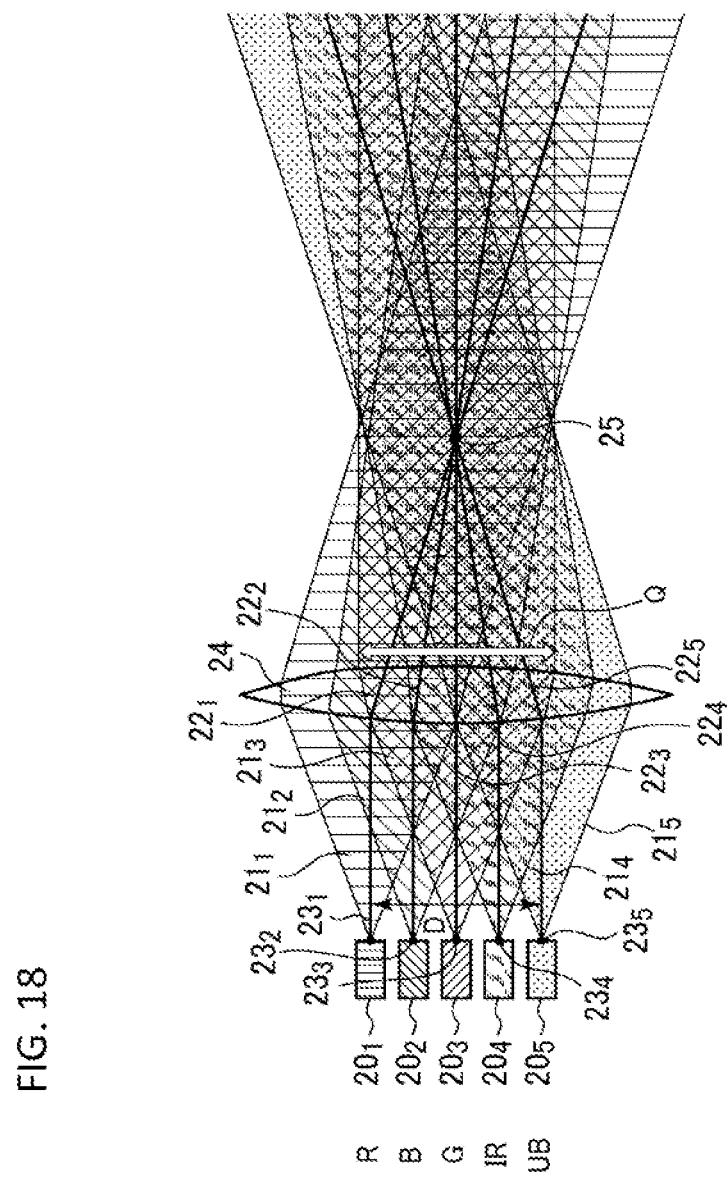

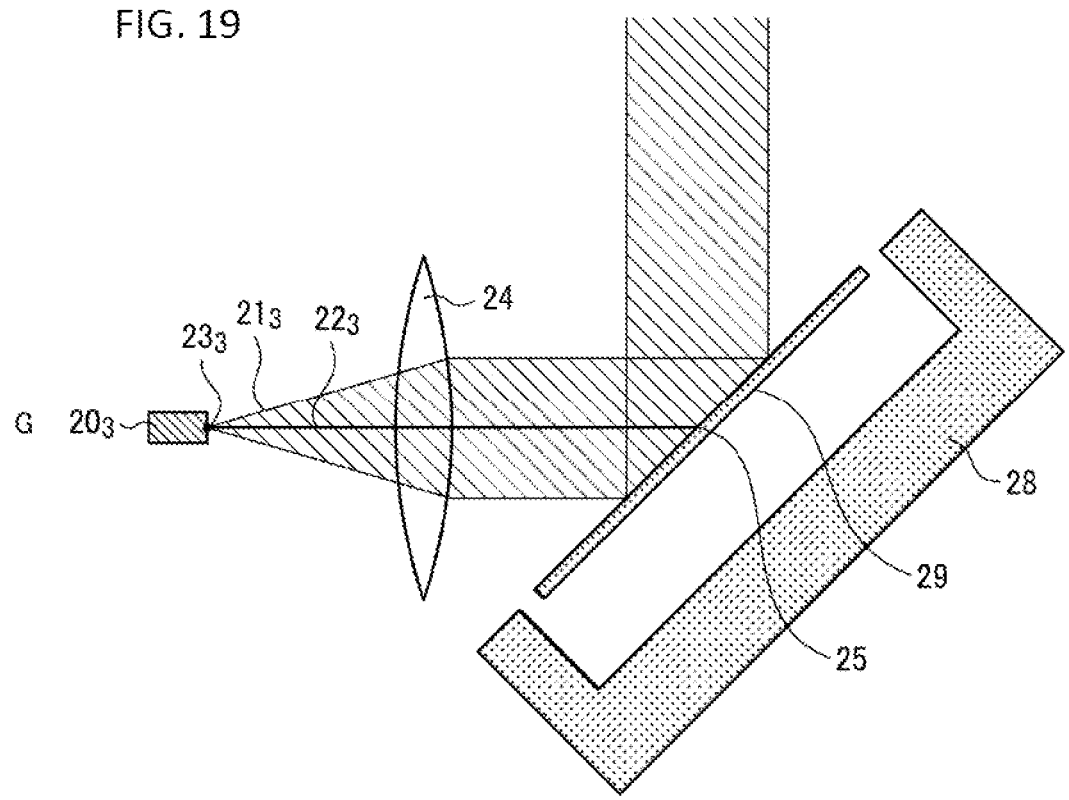

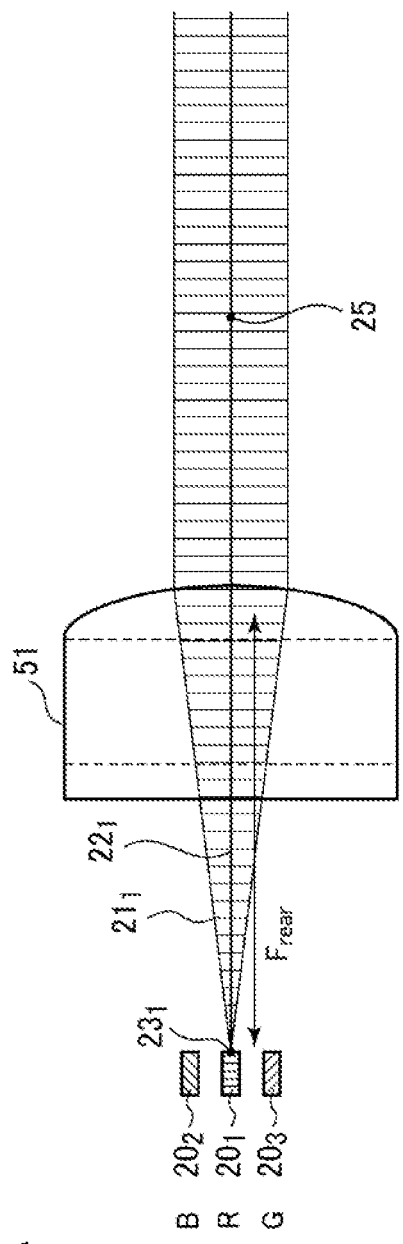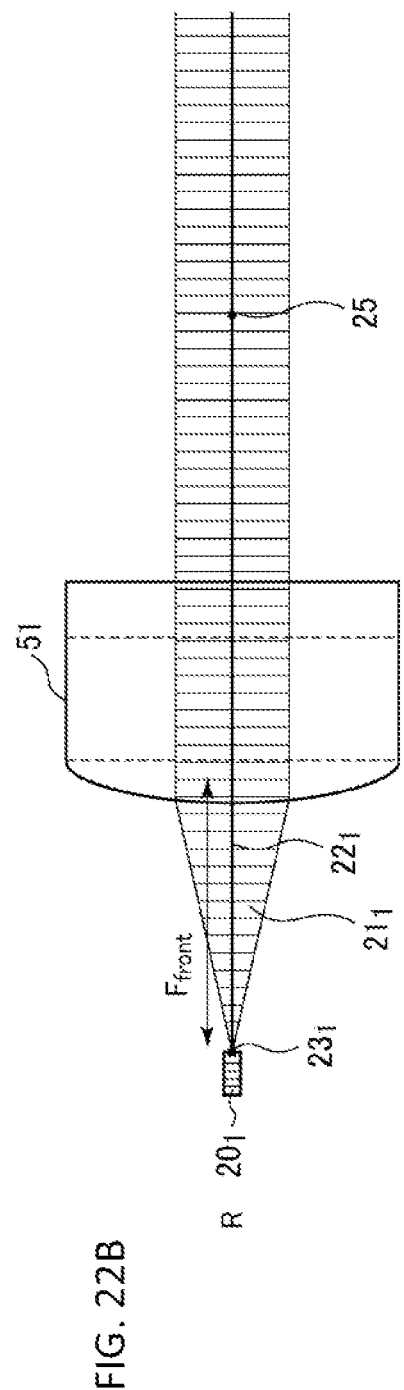

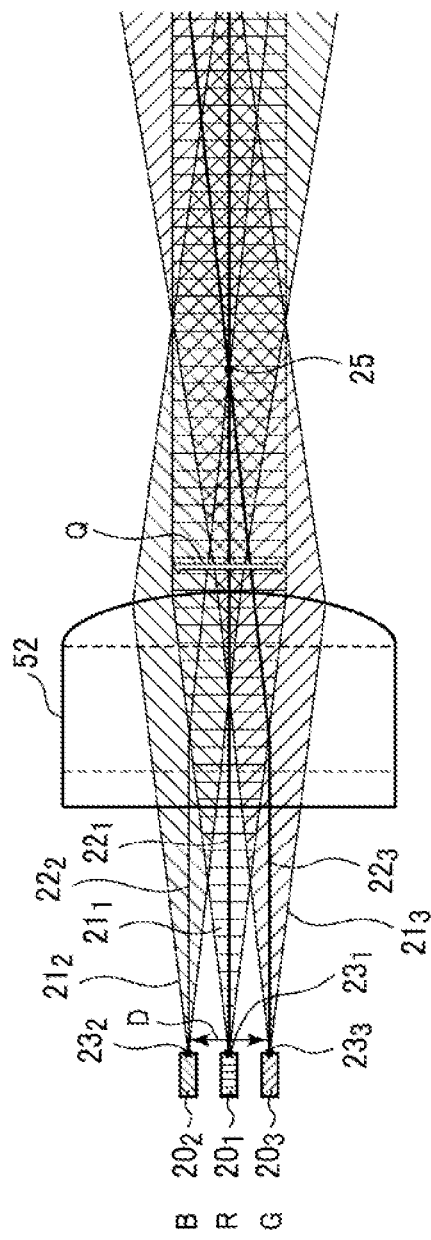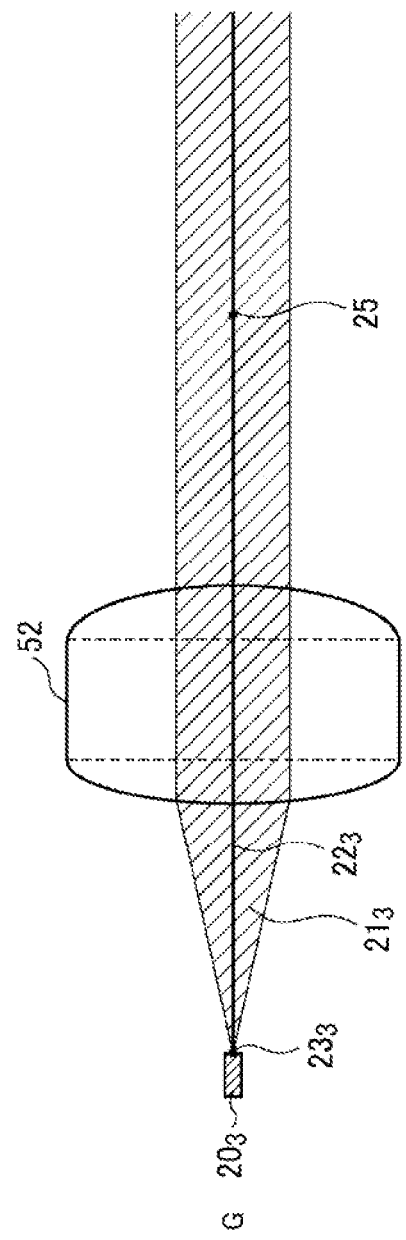
FIG. 23A
FIG. 23B

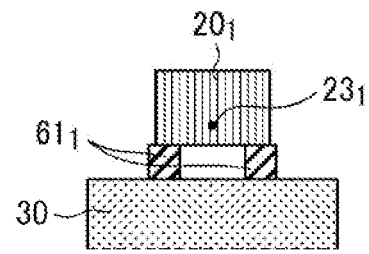
FIG. 25A
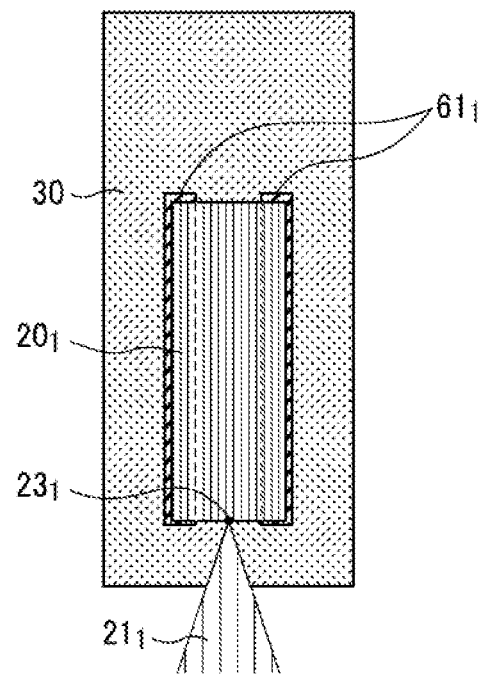
FIG. 25B
FIG. 25C
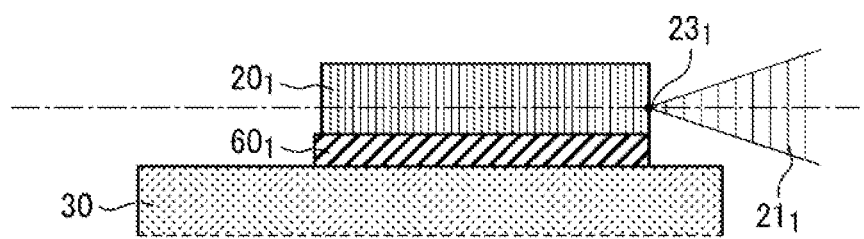

LIGHT BEAM EMISSION DEVICE AND LIGHT BEAM PROJECTION DEVICE EQUIPPED THEREWITH

CROSS-REFERENCE TO RELATED APPLICATION

This application is a continuation application of International Application Number PCT/JP2020/049252 filed on Dec. 28, 2020, now pending, herein incorporated by reference. Further, this application is based upon and claims the benefit of priority from the prior Japanese Patent Application No. 2020-061038, filed on Mar. 30, 2020, entire contents of which are incorporated herein by reference.

FIELD

The present invention relates to a light beam emission device and a light beam projection device equipped therewith, and provides a light beam emission device and a light beam projection device that can be downsized and have a simple configuration, for example.

BACKGROUND

For a light beam projection device that projects a color image using a plurality of light beams having different colors, a device that multiplexes each beam into one using a multiplexer and projects an image by performing two-dimensional scanning with the multiplexed beam onto a screen or the like, has been proposed (e.g. Patent Document 1).

On the other hand, a method of acquiring an image by directly scanning with a plurality of light beams without multiplexing the light beams, has been known for a long time (e.g. Patent Document 2 to Patent Document 4).

CITATION LIST

Patent Document

Patent Document 1: Japanese Patent No. 5817022
Patent Document 2: Japanese Patent Application Publication No. 2003-21800
Patent Document 3: European Patent No. 3054676
Patent Document 4: European Patent No. 2977808

However, in the case of the light beam projection device using a multiplexer, as in the case of Patent Document 1, a component for multiplexing light is needed, which makes the configuration of the device complicated and makes it difficult to downsize the device.

On the other hand, in the case of the light beam projection device that projects an image without multiplexing a plurality of light beams, as in the case of Patent Document 2 to Patent Document 4, the device configuration becomes simple, but color irregularity is generated, and it is difficult to acquire a high definition image since the beams are not integrated. This means that complicated processing is needed for the video signals, such as the adjustment of the timings of a video output signals (e.g. Patent Document 3 and Patent Document 4).

With the foregoing in view, it is an object of the present invention to provide a light beam projection device configured to project an image without multiplexing a plurality of light beams, and to provide: a light beam emission device with which a color irregularity is not generated and complicated processing of video signals, such as adjusting the timings of video output signals, is easily preformed; and a light beam projection device equipped therewith. In the present invention, the "light beam emission device" refers to a device that simply emits a plurality of light beams, and the "light beam projection device" refers to a device that scans with a light beam emitted from the "light beam emission device" using an optical scanning mirror or the like, and projects an image onto a screen or the like.

SUMMARY

According to another aspect of the invention, a light beam emission device comprising is provided with: a plurality of light sources; and a condensing member, wherein a range in the light source array direction, in which emission spots of light beams emitted from the plurality of light sources respectively exist, is within a size in the array direction of a light beam, immediately after the light beam emitted from the emission spot located most closely to the center of the plurality of light sources, with respect to the condensing member, passed through the condensing member.

According to another aspect, a light beam projection device includes: the above mentioned light beam emission device; and a reflection mirror that is disposed at a convergent point of the light beam from the light beam emission device, and is capable of performing two-dimensional optical scanning.

According to one aspect of the light beam emission device and the light beam projection device equipped therewith, the configuration of the light beam projection device is simplified and an increase in power of the light beam is allowed, since a multiplexer is not used. Therefore downsizing and an increase in power of the light beam projection device can be implemented without dropping the video image quality.

BRIEF DESCRIPTION OF DRAWINGS

FIG. 18 is a schematic configuration diagram of the light beam emission device of Example 12 of the present invention.

FIG. 19 is a schematic configuration diagram of the light beam projection device of Example 13 of the present invention.

FIGS. 22A and 22B indicate explanatory diagrams of an optical configuration of the light beam emission device of Example 15 of the present invention.

FIGS. 23A and 23B indicate schematic configuration diagrams of the light, beam emission device of Example 16 of the present invention.

FIGS. 25A to 25C indicate schematic configuration diagrams of the light beam emission device of Example 18 of the present invention.

DESCRIPTION OF EMBODIMENTS

Figure 1A:
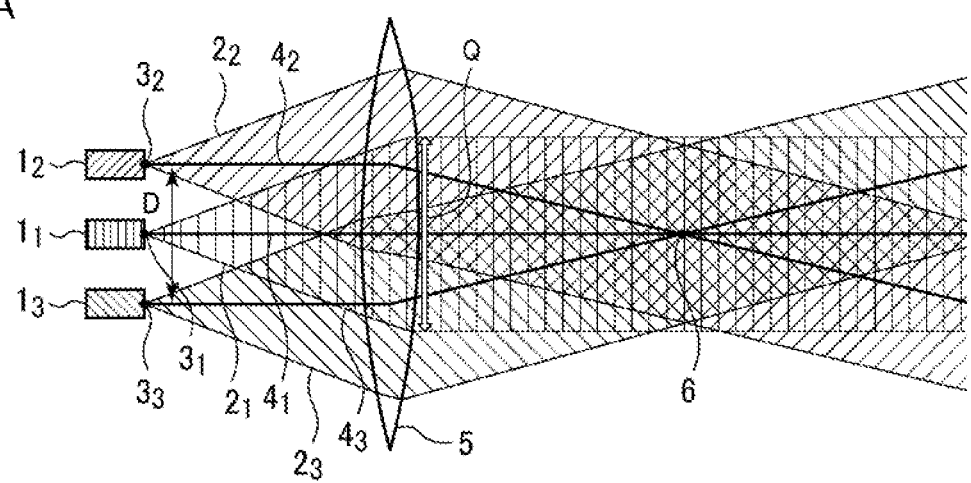
FIGS. 1A and 1B indicate explanatory diagrams depicting a configuration of the light beam emission device of the embodiment of the present invention.
Figure 1B:
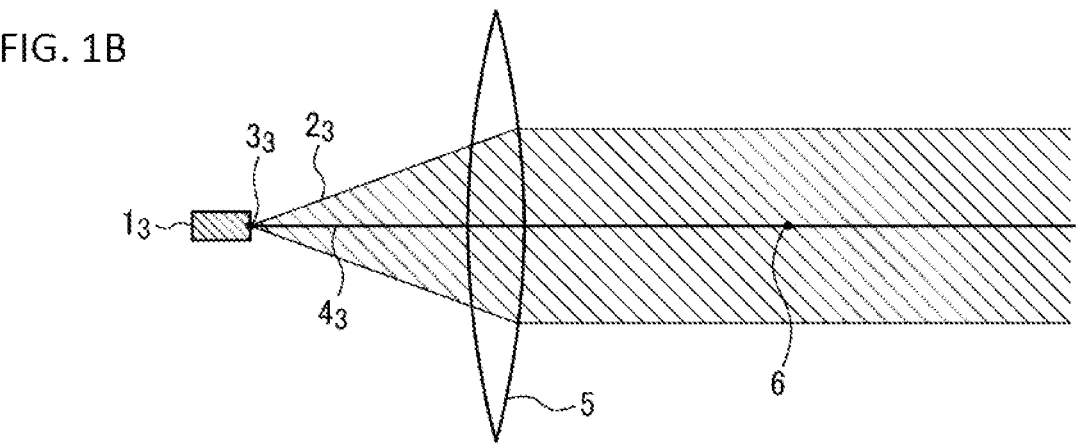

A light beam emission device of an embodiment of the present invention will be described with reverence to FIG. 1A to FIG. 6. FIGS. 1A and 1B indicate explanatory diagrams depicting a configuration of the light beam emission device of the embodiment of the present invention. FIG. 1A is a plan view and FIG. 1B is a side view. In FIGS. 1A and 1B, there are three light sources, but a number of light source may be arbitrary.

The light beam emission device is constituted of a plurality of light sources $1_1$ to $1_3$ and a single condensing member 5. The condensing member 5 used in this case is a condensing lens. Light beams $2_1$ to $2_3$ emitted from emission spots $3_1$ to $3_3$ of the light sources $1_1$ to $1_3$ travel toward the condensing member 5 such that light tracks $4_1$ to $4_3$ on the center axes of the lights become parallel with each other, while spreading the respective shapes of the light beams $2_1$ to $2_3$.

The light beams $2_1$ to $2_3$ are then condensed by the condensing member 5 and travel as a collimated light beam such that the light tracks $4_1$ to $4_3$ of the center axes of the lights emitted from the light sources $1_1$ to $1_3$ respectively cross each other. The collimated light beam refers to a light beam that travels without changing the beam diameter. The intersecting point of the light tracks $4_1$ to $4_3$ of the center axes of the lights is referred to as a "convergent point 6". The distance between the convergent point 6 and the condensing lens (condensing member 5) need not be mathematically the same as the focal distance of the condensing lens.

In this setting, the distance D of the plurality of light sources $1_1$ to $1_3$ in the array direction is not more than size Q of the light beam $2_1$, which was emitted from the light source $1_1$ disposed at the center and passed the condensing member 5. The diameter of the light beam $2_1$ in this case is set to a diameter such that when the light beam is approximated to a Gaussian beam, the optical power becomes $1/e^2$ (e: Napier's constant) from a value on the center axis. The size Q of the light beam $2_1$ passed the condensing member 5, refers to a beam diameter immediately after transmitting through a lens if the condensing member 5 is the lens, and refers to a beam diameter immediately after being reflected by a reflector if the condensing member 5 is the reflector.

By this setting:

a. In a case of projecting an image onto a screen or the like, a dead space on each side of the scanning screen can be decreased, and as a result, the image can be generated efficiently.

b. It becomes easier to adjust the timings of video signals that are generated by the difference of the positions of the emission spots of the light sources, which emit light beams of red, blue and green to acquire color images. In other words, by providing a simple time lag, which is approximately in proportion to the difference of the positions of individual emission spots, to signals, a color video without color irregularity and color deviation can be acquired without complicated signal processing. This state will be described with reference to FIG. 2A to FIG. 6. Here the diameter of the beam of the light source $1_1$, disposed at the center, is used, even in a case where the diameters of the light beams $2_1$ to $2_3$ of the plurality of the light source $1_1$ to $1_3$ that passed the condensing member 5 are different.

Figure 2A:
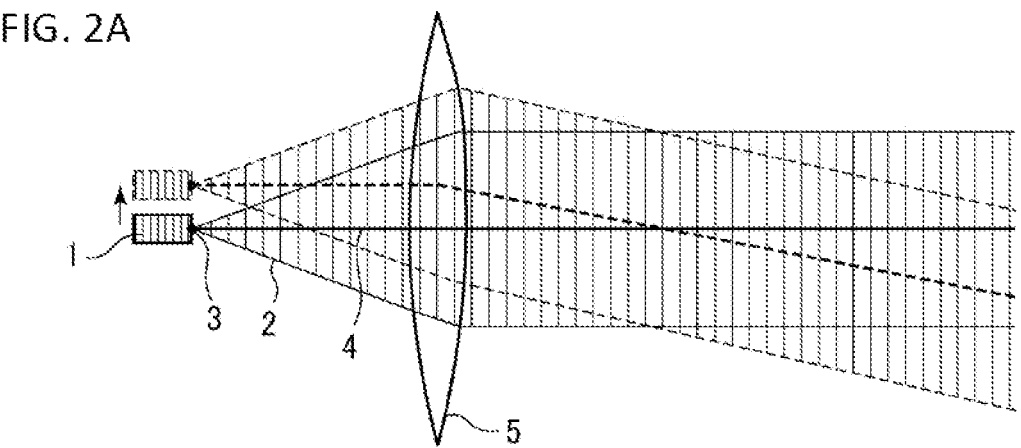
FIGS. 2A to 2C indicate explanatory diagrams in a case where a position of the light source is deviated.
Figure 2B:
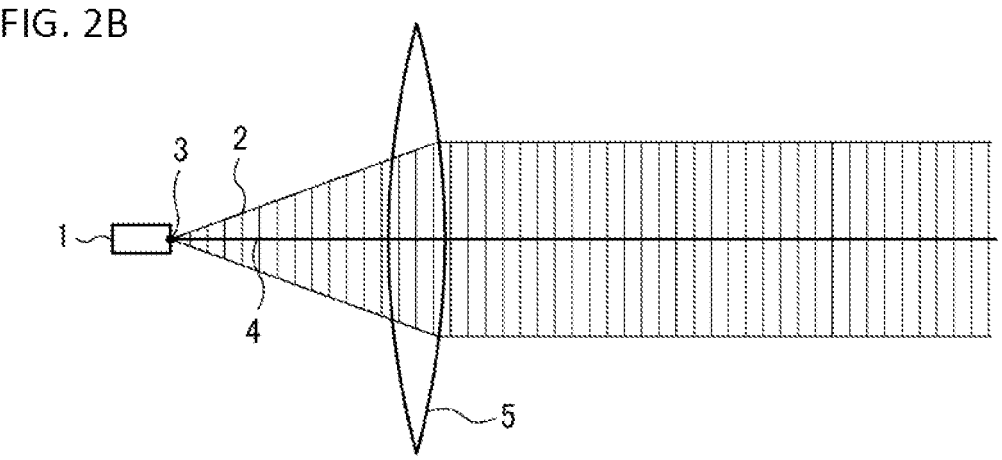
Figure 2C:
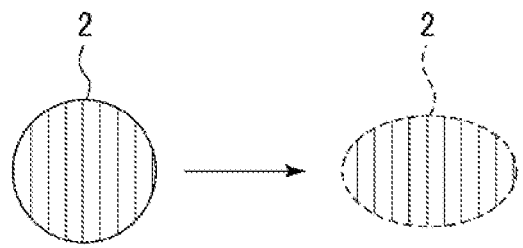

FIGS. 2A to 2C indicates explanatory diagrams in a case where a position of the light source is deviated, where FIG. 2A is a plan view in a case where the light source is deviated, FIG. 2B is a side view thereof, and FIG. 2C is an explanatory diagram of a change in a cross-sectional shape. As illustrated in FIGS. 2A to 2C, in the case where the light beam 2 emitted from the light source 1 is collimated to a collimate beam by the condensing member 5 (a single lens in the case of FIGS. 2A to 2C), if the light source 1 is moved in the lateral direction (array direction of light sources: vertical direction in FIGS. 2A to 2C), the light beam 2 transforms as illustrated in FIG. 2A. The cross-sectional shape of the light beam 2, in particular, is distorted from a circle to an ellipse, as illustrated in FIG. 2C, when the light beam 2 is isotropically emitted.

Figure 3:
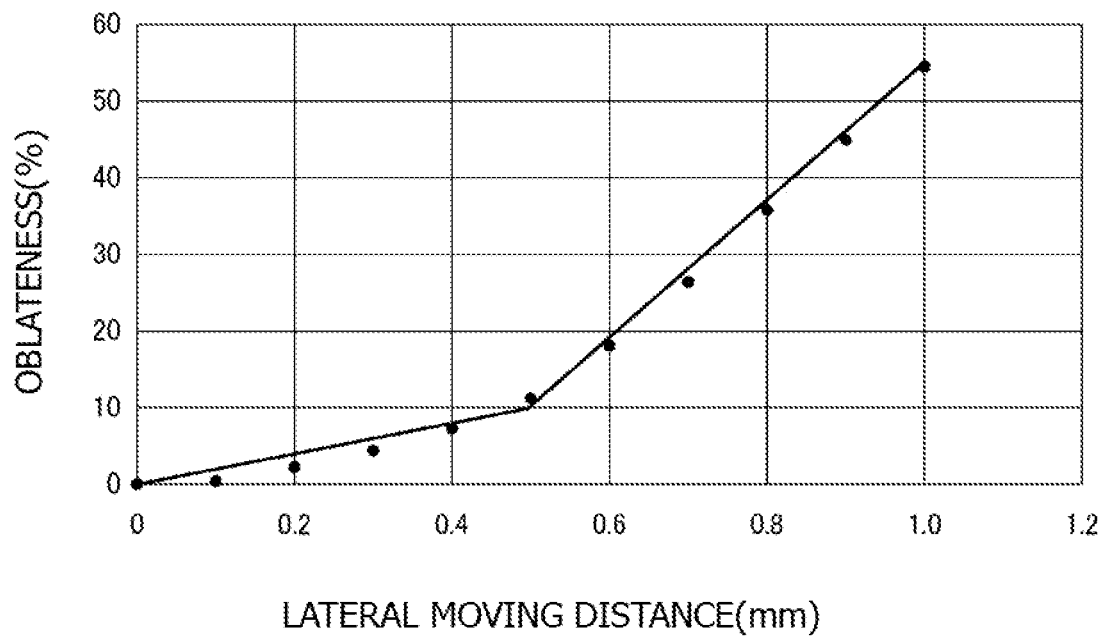
FIG. 3 is a graph indicating the relationship of the lateral moving distance between the light source and the oblateness of the cross-sectional shape of the light beam.

FIG. 3 is a graph indicating the relationship of the lateral moving distance between the light source and the oblateness of the cross-sectional shape of the light beam. Here a simulation was performed assuming that the diameter of the collimate beam (corresponds to Q in FIGS. 1A and 1B) is 1 mm, the focal distance of the single lens is 6 mm, and the aperture of the single lens is 4 mm. As FIG. 3 indicates, the oblateness exceed 10% when the lateral moving distance is around 0.5 mm, and the oblateness suddenly increases when the lateral moving distance becomes larger than 0.5 mm. Normally the oblateness is preferably one digit or less, so that the beam quality does not drop. The oblateness is expressed by oblateness=1−ellipticity, and the ellipticity is expressed by the ratio of the minor axis and the major axis.

The result indicates that when the light source $1$ is disposed in a position exceeding the range (range of −0.5 mm to 0.5 mm), the shape of the light beam $2$ thereof deteriorates significantly. This result is generally valid under practical conditions (the emission angle of the light source $1$ is within 30° and the collimate beam diameter is within 5 mm), regardless the type of the condensing lens, the diameter of the light beam, the focal distance of the lens and the emission angle of the light source $1$, or even if the emission angle of the laterally moved light source $1$ is different from the emission angle of the light source $1$ at the original position.

Even in the case where the emission angle is not isotropical and the cross-sectional shape of the light beam $2$ emitted from the light source $1$ is originally an ellipse, the result is the same as above if the beam diameter in the array direction (lateral direction) of the light sources is used. This means that it is preferable that the range D of the array direction of the light sources, where the emission spots of each light beam emitted from the plurality of light sources exist respectively, is within the range Q of the diameter of the light beam in the array direction of the light sources, immediately after the light beam $2$ passed through the condensing member $5$.

Figure 4:
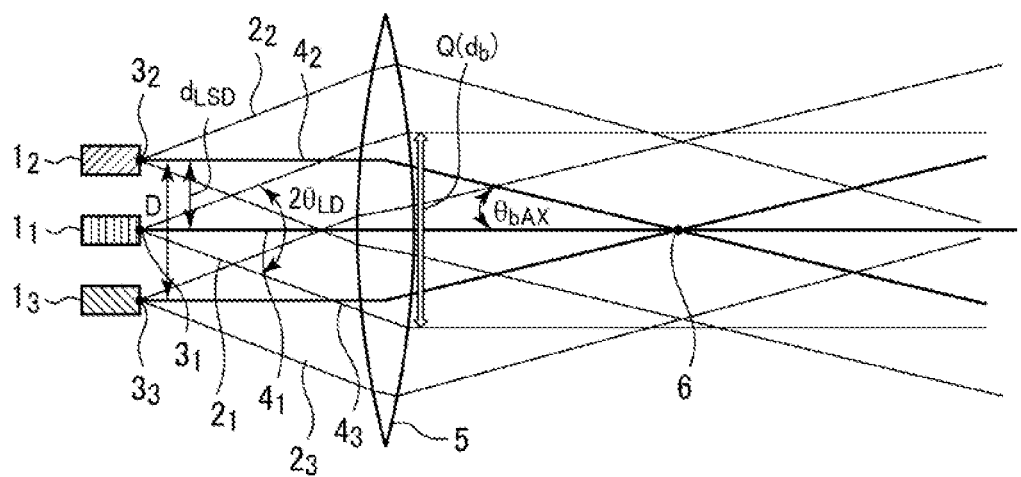
FIG. 4 is a diagram of explaining the issue of the dead space of the image.
Figure 5:
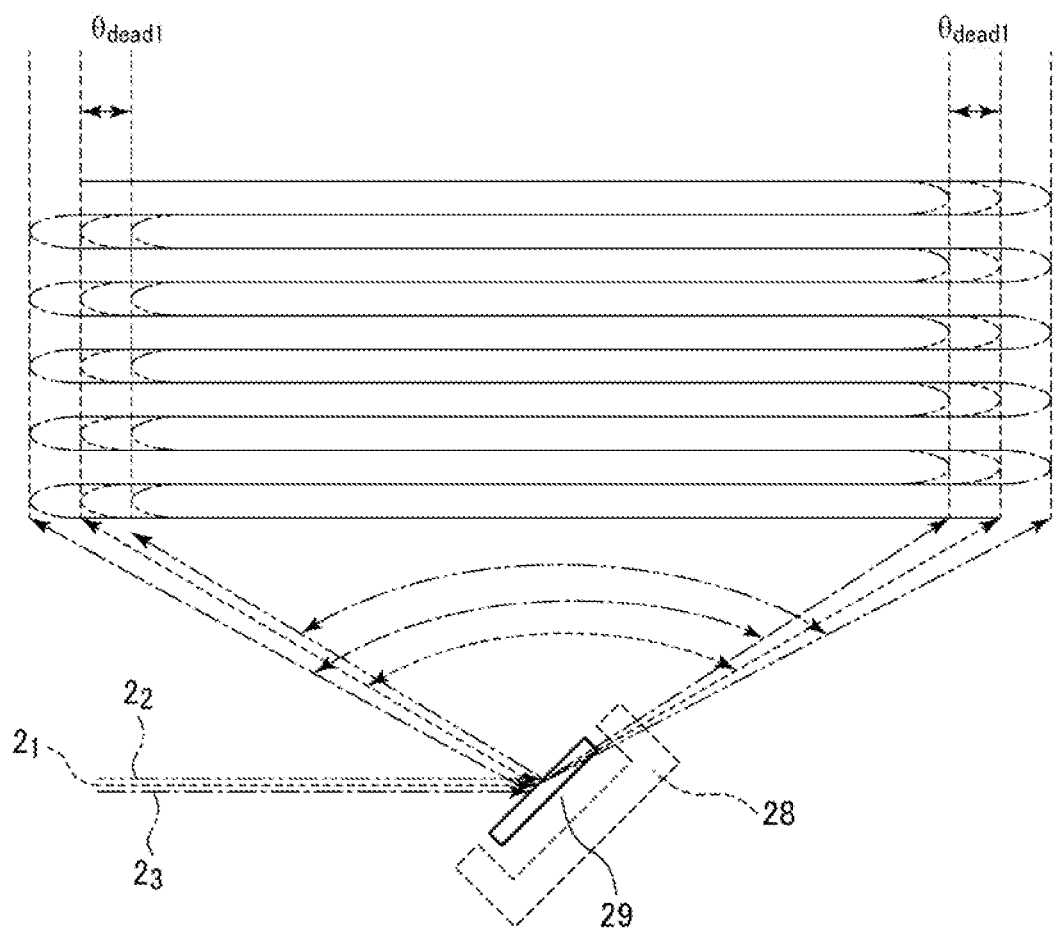
FIG. 5 is a diagram of explaining each dead space (in the case where the light beam 21 is the reference) of the scan image.

The issue of the dead space of the image will be described next with reference to FIG. 4 and FIG. 5. In FIG. 4A, the relationship when the light beams $2_1$ to $2_3$ emitted from the light sources $1_1$ to $1_3$ become the collimate light by the condensing lens $5$ is expressed by the following expression when a number of light sources is 3.

$$d_{LDS}(1/2)(\tan((1/2)\theta_{dead})/\tan\theta_{LD}) \times d_0$$

Here $d_{LDS}$ indicates a distance between the emission spots of the light source $1_1$ and the light source $1_2$, $\theta_{LD}$ indicates a half of the emission angle of the light beam emitted from the light source $1_1$, $d_b$ indicates the diameter of the collimated light beam after the light emitted from the light source $1_1$ passed through the condensing lens $5$, and $\theta_{bAX}$ indicates an angle formed by a light track $4_2$ of the center axis of the light beam of the light source $1_2$ and the center axis (light track $4_1$) of the light beam of the light source $1_1$ after the light rack $4_2$ of the center axis of the light beam of the light source $1_2$ passed through the condensing lens $5$, and here $$\theta_{dead}=2\theta_{bAX}$$

$\theta_{dead}$ indicates a totality of angles corresponding to the dead spaces where none of the three beams reach the screen when the scanning is performed with the light beam in the lateral direction using one scanning mirror. In FIG. 5, in the case where the light beam $2_1$ is the reference, the totality of each dead space $\theta_{dead}$ of the scan image in FIG. 5 becomes $\theta_{dead1}$ ($\theta_{dead1}+\theta_{dead1}=\theta_{dead}$), excluding overlapped angles. Here the scanning mirror is assumed to be an MEMS mirror device that includes a movable mirror unit $29$.

As a result of examination, the adjustment of the timings of video signals becomes significantly easier when the totality of the angles corresponding to the dead spaces is at least smaller than the spread angle $2\theta_{LD}$ of the light beam emitted from the light source ($\theta_{dead}<2\theta_{LD}$), hence $d_{LDS}<d_b/2$ must be satisfied. Needless to say, smaller dead spaces on both sides are more effective to generate the image efficiently. In other words, since D is $2d_{LDS}$ and Q in this case is $d_b$, D<Q is structurally desirable.

These results generally are valid under practical conditions (emission angle of light source: within 30°; collimate beam diameter: within 5 mm). Even if a number of light sources is 3 or more, it is preferable that the light sources disposed at the outermost sides are within the range Q of the light source disposed at the center.

The convergent point $6$ need not match with the focal distance of the condensing member $5$, but may be shorter than the focal distance of the condensing member $5$. For this, the light sources $1_2$ and $1_3$ disposed on both sides of the light source $1_1$ disposed at the center may be tilted inward. An advantage of disposing the optical scanning mirror at the convergent point $6$ is that the size of the light beam projection device can be decreased.

Generally the layer structure of the semiconductor laser differs depending on the semiconductor material, hence the positions of the centers in the height direction of the emission spots $3_1$ to $3_3$ of the light sources (semiconductor lasers) $1_1$ to $1_3$, of which emission wavelengths are different, may be different. In the case where scanning is performed with the light beams $2_1$ to $2_3$, from the emission spots $3_1$ to $3_3$ of which positions of the centers in the height direction are different, using an optical scanning mirror and a raster scan image (raster sweep with a lateral direction high-speed sweep and a height direction low-speed sweep), color irregularity and color deviation may occur.

Figure 6:
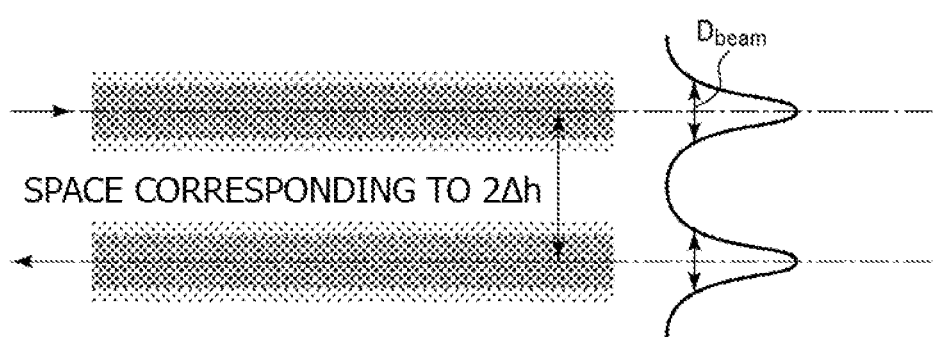
FIG. 6 is a conceptual diagram of a raster scan in the case of forming an image by sweeping back and forth.

FIG. 6 is a conceptual diagram of a raster scan in the case of forming an image by sweeping back and forth. A raster scan is a method of acquiring a two-dimensional image on a two-dimensional surface by one-dimensionally scanning dots first to acquire a line (scan line), then secondly by scanning the lines in the perpendicular direction.

In order to prevent the above mentioned color irregularity and color deviation, the light sources $1_1$ to $1_3$ may be disposed on a base having steps, so that the difference of the heights (vertical direction to the array direction of the light sources) of the centers of the emission spots $3_1$ to $3_3$ becomes within $\Delta h$. In an image that is raster-scanned onto a screen or the like, $\Delta h$ is a value corresponding to ½ of the space between the closest scan lines used for the image generation by repeatedly scanning in the lateral direction. In other words, if the position of the emission spot is changed by $\Delta h$ in the height direction, the projected position on the screen changes by ½ of the space between the scan lines. Here the lateral direction at a high-speed sweep scan line is acquired by performing scanning with the light beam in the array direction of the light sources (lateral direction). A raster sweep of the height direction at a low-speed sweep is acquired by performing scanning with the light beam in the vertical direction to the array direction of the light sources. Therefore in the case of projecting an image by performing scanning with the light beams $2_1$ to $2_3$, a high quality image without color irregularity and color deviation can be acquired. If there is a need, a step may be formed on the front face of the base, so that the light beams $2_1$ to $2_3$ emitted from the emission spots $3_1$ to $3_3$ are not interrupted by the base. $D_{beam}$ is a beam diameter expressed by a $1/e^2$ total width.

In the case of using the condensing lens as the condensing member, the chromatic aberration caused by the difference in wavelengths of the light beams $2_1$ to $2_3$ emitted from the light sources $1_1$ to $1_3$ may be corrected by changing the positions of the travelling directions of the lights from the emission spots $3_1$ to $3_3$ of the light beams $2_1$ to $2_3$ emitted from the light sources $1_1$ to $1_3$ respectively, and the emission directions of the light beams $2_1$ to $2_3$, so that all of the light beams $2_1$ to $2_3$ intersect at one convergent point.

For example, it is assumed that the red light beam $2_1$ is emitted from the emission spot $3_1$ of the light source $1_1$ at the center, the blue light beam $2_2$ is emitted from the emission spot $2_2$ of the light source $1_2$, and the green light beam $2_3$ is emitted from the emission spot $3_3$ of the light source $1_3$. Here the positions of the emission spots $3_1$ to $3_3$ of the light beams $2_1$ to $2_3$ in the light traveling direction are disposed so as to be slightly more distant from the condensing lens in the descending order of the wavelength, that is, in the sequence of red, green and blue, then the chromatic aberration of the single condensing lens can be corrected so that all the light beams $2_1$ to $2_3$ intersect at one convergent point 6.

Instead of changing the positions of the emission spots $3_1$ to $3_3$ of the light beams $2_1$ to $2_3$ in the light travelling direction, the emission direction of the blue light beam $2_2$ from the light source $1_2$ may be turned slightly outward, and the green light beam $2_3$ from the light source $1_3$ may be turned slightly outward. Further, along with changing the positions of the emission spots $3_1$ to $3_3$ of the light beams $2_1$ to $2_3$ in the light travelling direction of the light beam, the chromatic aberration may be corrected by changing the emission directions of the light beams $2_1$ to $2_3$. In the above example, a case of red, blue and green light beams $2_1$ to $2_3$ was described, but even in a case of using a light source having a different wavelength, the chromatic aberration can be corrected by a similar configuration.

For the condensing member 5, a concave surface reflection mirror may be used instead of a single condensing lens. In this case, the basic configuration of light sources and the like is the same as the case of using the condensing lens, but an advantage of using a concave surface reflection mirror for condensing light is that the problem of chromatic aberration caused by using the condensing lens is solved.

In this case, both a side face reflection and an upper face reflection can be implemented depending on the position where the concave surface reflection mirror is disposed. The angles of deflecting the light beams $2_1$ to $2_3$ by a concave surface reflection mirror may be a right angle or an angle other than a right angle, and may be determined depending on the application. Furthermore, the same effect can be acquired by using a holographic lens for condensing light, or a reflector, instead of the concave surface reflection mirror.

In the description on FIGS. 1A and 1B, collimated light beams $2_1$ to $2_3$ are used, but the light beam emission device may use a condensed light beam, which is condensed at a position ahead of the condensing member 5. For the light sources $1_1$ to $1_3$, typically semiconductor lasers are used, but light-emitting diodes (LEDs) may be used. For the wavelengths, typically three primary colors, red light, green light and blue light, are used, but yellow light, infrared light, ultraviolet light, or the like, may be used.

In the case of constructing a light beam projection device, the center of the mirror surface of the optical scanning mirror is aligned with the convergent point of the light beam emission device. By aligning the convergent point with the center of the mirror surface like this, the area of the mirror surface can be decreased, and as a result, the light beam projection device can be downsized.

In the embodiment of the present invention, a multiplexer is not used, hence the configuration of the light beam emission device is simplified, and the light beam projection device can be downsized. Further, a light beam projection device, with which the image quality does not drop can be implemented, even if the light beams are not multiplexed to one beam using a multiplexer. Furthermore, the power of the light beam can be increased by simplifying increasing a number of light sources, therefore a light beam projection device, in which failure rarely occurs, can be implemented.

EXAMPLE 1

Figure 7A:
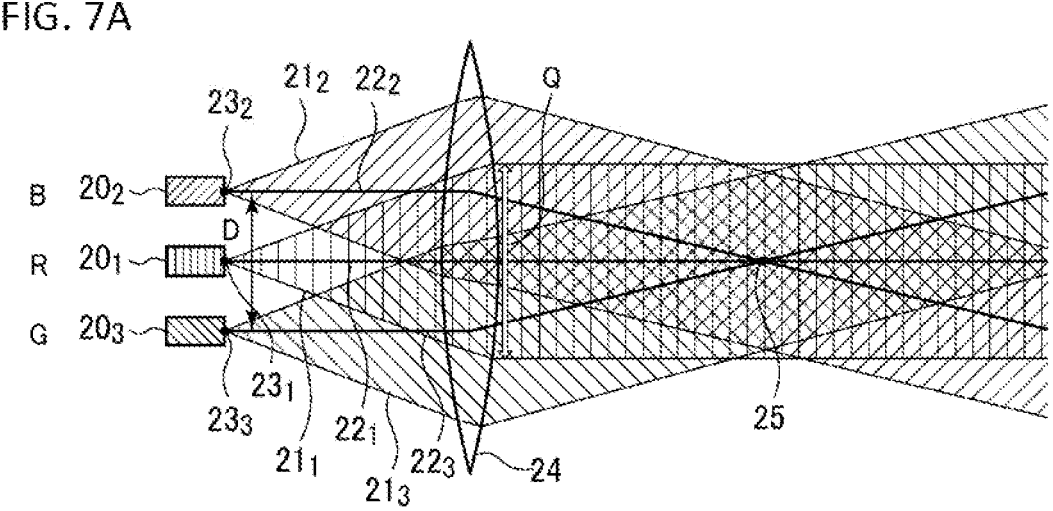
FIGS. 7A and 7B indicate schematic configuration diagrams of the light beam emission device of Example 1 of the present invention.
Figure 7B:
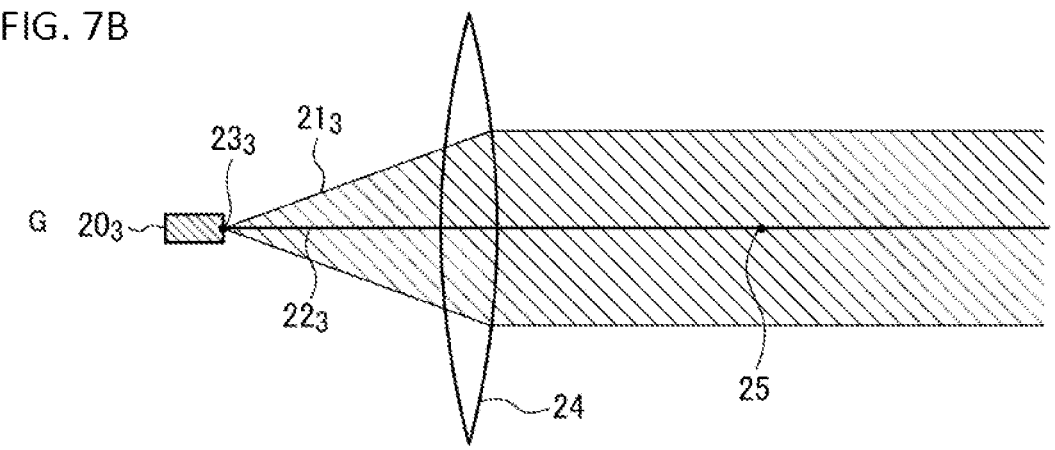

A light beam emission device of Example 1 of the present invention will be described with reference to FIGS. 7A and 7B. FIGS. 7A and 7B indicate schematic configuration diagrams of the light beam emission device of Example 1 of the present invention, where FIG. 7A is a top view and FIG. 7B is a side view. A red semiconductor laser $20_1$ of which emission wavelength is 635 nm, a blue semiconductor laser $20_2$ of which emission wavelength is 450 nm, and a green semiconductor laser $20_3$ of which emission wavelength is 520 nm, are disposed in parallel at 0.2 mm intervals. In this case, the spread angle of the emission beam of each semiconductor laser is 10° at a $1/e^2$ total width. The $1/e^2$ total width is a diameter for the optical power to become $1/e^2$ (e: Napier's constant) from a value on the center axis when the emission beam from each semiconductor laser is approximated to a Gaussian beam.

For the condensing lens 24, a single lens of which aperture is 2.5 mmφ and the focal distance is 5.72 mm, for example, is used. The single lens is selected here because the configuration can be simplified and the core of manufacturing the device can be low. The light beams $21_1$ to $21_3$ travel from each semiconductor layer, while spreading the beams toward the condensing lens 24. Then the light beams $21_1$ to $21_3$ are condensed by the condensing lens 24, and after passing the condensing lens 24, travel as collimated light beams such that the light tracks $22_1$ to $22_3$ of the center axes of the lights emitted from the respective light sources intersect. The collimate beam diameter in this case is 1 mmφ. A collimated light beam refers to a light beam that travels without changing the beam diameter.

The light tracks $22_1$ to $22_3$ of the center axes of the light beams intersect at a convergent point 25. The distance between the convergent point 25 and the center point of the condensing lens 24 is approximately the same as the focal distance of the condensing lens 24. In this case, a range D in the light source array direction, where emission spots of the light beams $21_1$ to $21_3$ emitted from the red semiconductor laser 20 to the green semiconductor laser $20_3$ respectively, is within a size Q (1 mm) of the light beam $21_2$, immediately after the light beam emitted from the emission spot $23_1$ at the center which passed through the condensing lens 24.

Further, the total of the angles corresponding to the dead spaces of the image is at least smaller than the spread angle of the light beam emitted from the light source, hence the adjustment of the timings of the video signals becomes significantly easier. As a result, a compact light beam emission device, of which length is 10 mm, is acquired, and a high definition projection device equipped therewith can be implemented. The sequence of disposition of the light sources is not bound to the sequence of Example 1, but may be changed. In the other examples that follow as well, the sequence of disposition of the light sources described in each example is not bound to that sequence.

EXAMPLE 2

Figure 8A:
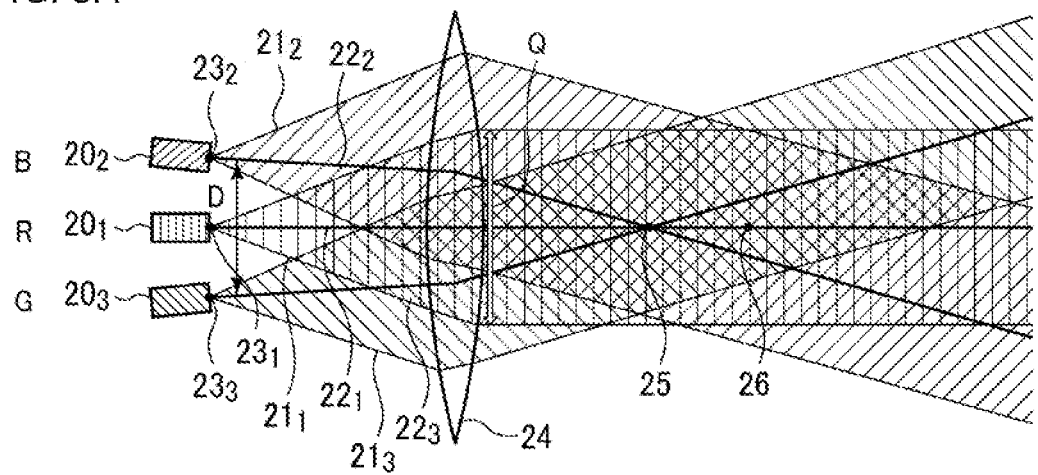
FIGS. 8A and 8B indicate schematic configuration diagrams of the light, beam emission device of Example 2 of the present invention, FIGS. 9A to 9C indicate schematic configuration diagrams of the light beam emission device of Example 3 of the present invention.
Figure 8B:
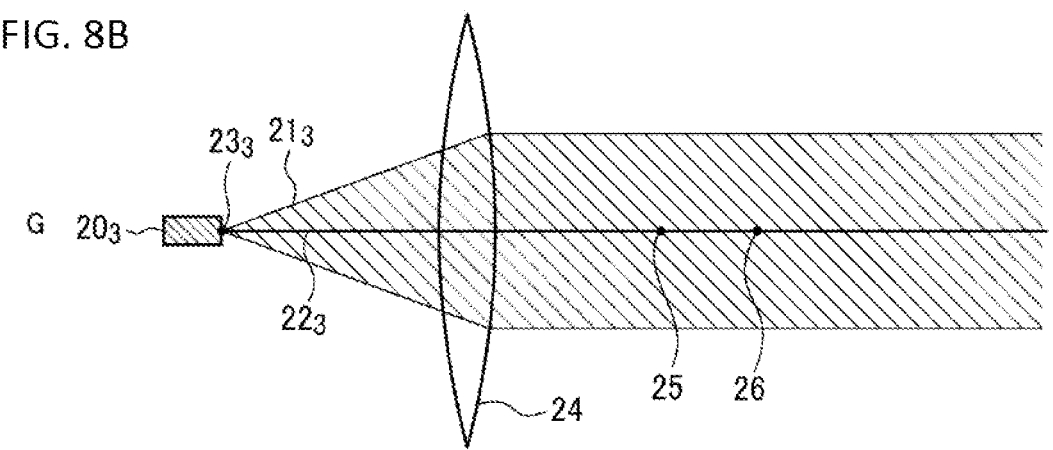

A light beam emission device of Example 2 of the present invention will be described with reference to FIGS. 8A and 8B. FIGS. 8A and 8B indicate schematic configuration diagrams of the light beam emission device of Example 2 of the present invention, where FIG. 8A is a top view and FIG. 8B is a side view, which are the same as Example 1 described above, except for the disposition of each light source.

In other words, the red semiconductor laser 20$_1$ of which emission wavelength is 635 nm, the blue semiconductor laser 20$_2$ of which emission wavelength is 450 nm, and the green semiconductor laser 20$_3$ of which emission wavelength is 520 nm, are disposed in parallel at 0.2 mm intervals, and the blue semiconductor laser 20$_2$ and the green semiconductor laser 20$_3$ are disposed tilted with respect to the optical axis of the red semiconductor laser 20$_1$.

The position of the convergent point 25 in this case is a position that is 3 mm from the center of the condensing lens 24, and is closer to the condensing lens 24 from the focal distance (26) of the condensing lens 24, which is 5.72 mm. Therefore a light beam emission device, of which length is 7.3 mm, that is even smaller than Example 1, can be acquired, and a high definition projection device equipped therewith can be implemented.

EXAMPLE 3

Figure 9A:
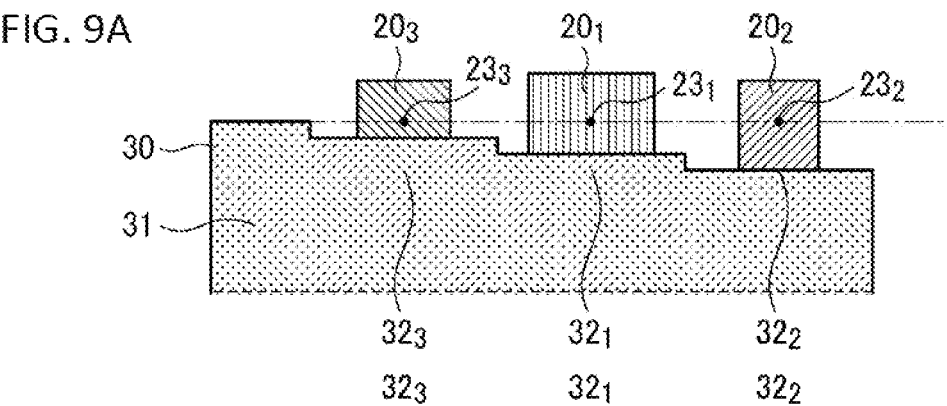
Figure 9B:
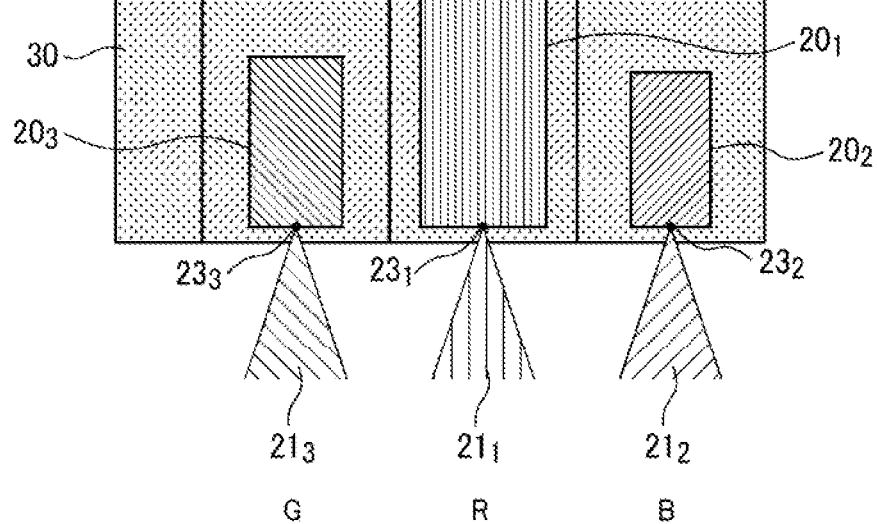
Figure 9C:
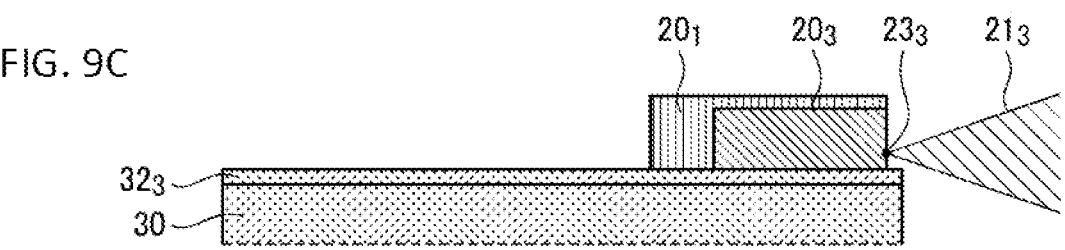

A light beam emission device of Example 3 of the present invention will be described with reference to FIGS. 9A to 9C. FIGS. 9A to 9C indicate schematic configuration diagrams of the light beam emission device of Example 3 of the present invention, where FIG. 9A is a front view, FIG. 9B is a top view, and FIG. 9C is a side view. In Example 3, each light source is installed on a base having steps, and the rest of the configuration is the same as Example 1 described above. Here illustration of the condensing lens is omitted.

For a base 30 in Example 3, a 1 mm thick Si substrate 31 is formed by selective gas-phase etching using an etching mask formed by a contact exposure method. On this base 30 on which steps 32$_1$ to 32$_3$ are formed, the red semiconductor laser 20$_1$, the blue semiconductor laser 20$_2$ and the green semiconductor laser 20$_3$ of which emission wavelength is 520 nm, are mounted so that the emission spots 23$_1$ to 23$_3$ are aligned.

In this case, as illustrated in FIGS. 9A to 9C, each of the semiconductor lasers 20$_1$ to 20$_3$ is disposed on the base 30 having steps, and the heights of the centers of the emission spots 23$_1$ to 23$_3$ are aligned so that the difference of the heights thereof is within Δh. When scanning is performed with the light beams emitted from the emission spots 23$_1$ to 23$_3$ using the optical scanning mirror, and a raster image is formed on the screen or the like (raster sweep with a lateral direction high speed sweep and a height direction low speed sweep, and the lateral direction sweep is in the array direction), Δh is a value corresponding to ½ of the distance between the closest scan lines which are repeatedly scanned in the lateral direction and are used for generating the image, and here the difference of the heights of the centers of the emission spots 23$_1$ to 23$_3$ is within 3 μm. Thereby in the case of projecting an image by performing scanning with the light beam, a high quality image without color irregularity and color deviation can be acquired.

EXAMPLE 4

Figure 10A:
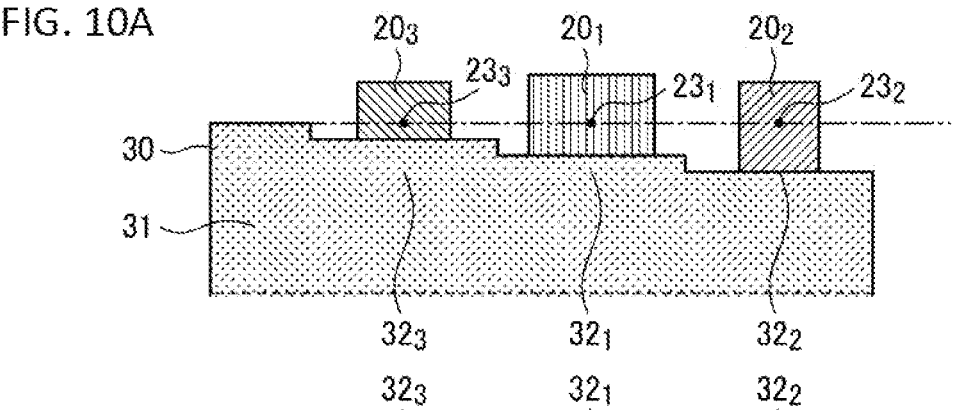
FIGS. 10A to 10C indicate schematic configuration diagrams of the light beam emission device of Example 4 of the present invention.
Figure 10B:
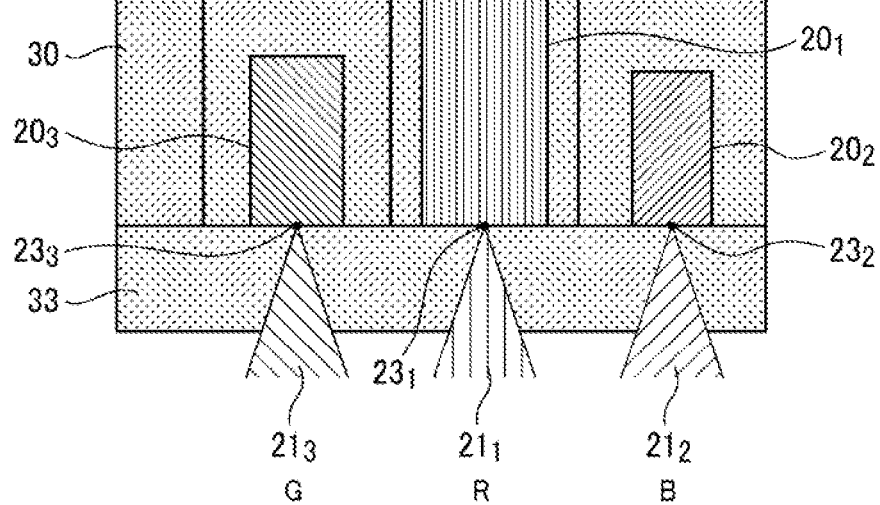
Figure 10C:
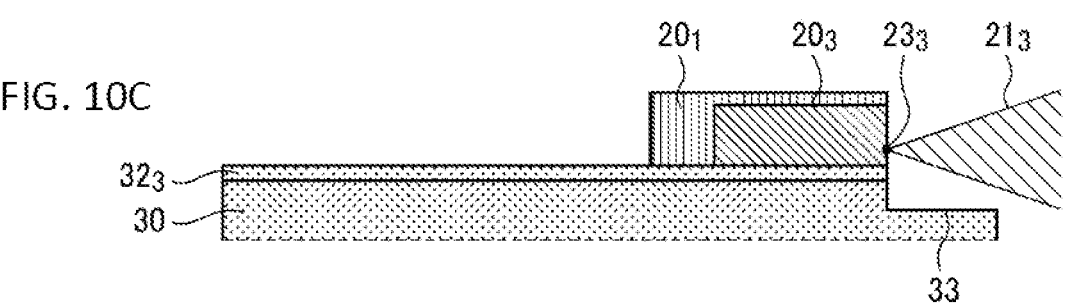

A light beam emission device of Example 4 of the present invention will be described with reference to FIGS. 10A to 10C. FIGS. 10A to 10C indicate schematic configuration diagrams of the light beam emission device of Example 4 of the present invention, where FIG. 10A is a top view and FIG. 10B is a side view. In Example 4, a step portion 33 is further disposed on the emission end face side of the base 30 having steps, and the rest of the configuration is the same as Example 3 described above.

Since the step portion 33 is formed on the emission end face side of the base 30, the light beam, which is emitted from the emission spot and spread downward, is not interrupted by the base 30. By using the light beam emission device in which the base having the steps is disposed, the 720P specification (1280×720 pixels) on high definition projection devices can be implemented.

EXAMPLE 5

Figure 11:
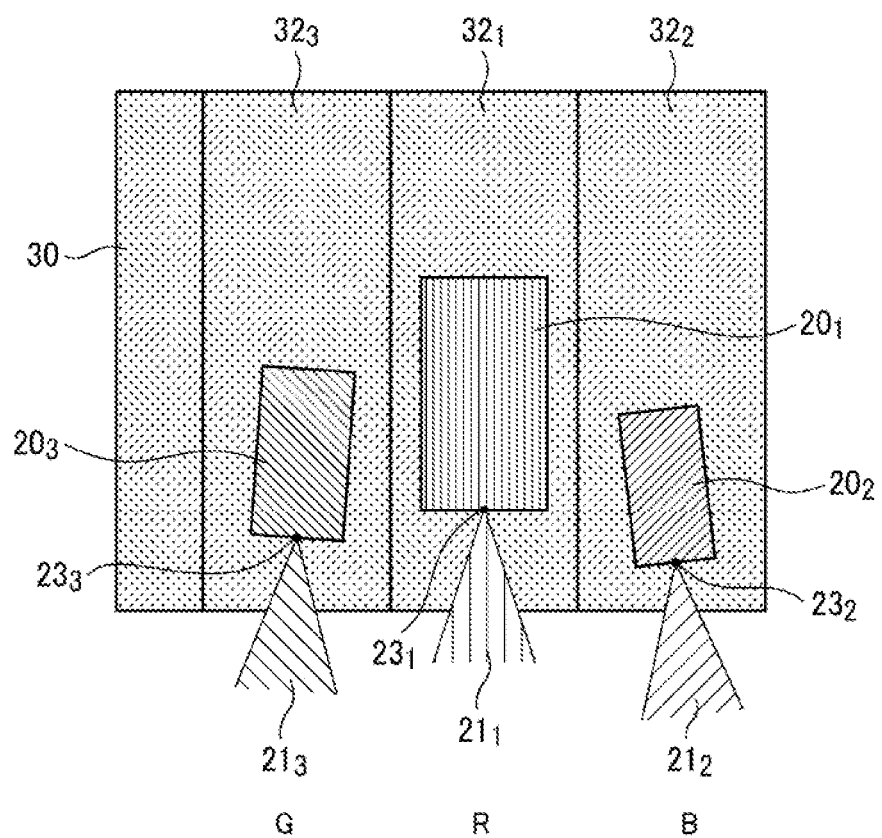
FIG. 11 is a schematic plan view of the light beam emission device of Example 5 of the present invention.

A light beam emission device of Example 5 of the present invention will be described with reference to FIG. 11. FIG. 11 is a schematic plan view of the light beam emission device of Example 5 of the present invention. The confirmation is the same as Example 3 described above, except that the positions of the emission spots of the light beams emitted from the plurality of light sources in the light traveling direction and the emission directions of the light beams are different.

Here the green semiconductor laser 20$_3$ is disposed such that the emission direction thereof is slightly turned outward from the red semiconductor laser 20$_1$, and the emission spot 23$_3$ thereof is closer to the condensing lens than the emission spot 23$_1$ of the red semiconductor laser 20$_1$. The blue semiconductor laser 20$_2$ is disposed such that the emission direction thereof is slightly turned outward from the red semiconductor laser 20$_1$, and the emission spot 23$_2$ thereof is closer to the condensing lens than the emission spot 23$_3$ of the green semiconductor laser 20$_3$.

By this disposition, the emission spots 23$_1$ to 23$_3$ are slightly more distant from the condensing lens in the descending order of wavelength, that is, in the sequence of red, green and blue, and the emission directions are tilted, hence the chromatic aberrations of the single condensing lens can be corrected, so that all the light beams 21$_1$ to 21$_3$ intersect at one convergent point. Here both the positions of the emission spots of the light beams in the light traveling direction and the emission directions of the light beams are changed, but the chromatic aberration can be corrected by changing only one of these. In Example 5 too, the step portion 32 may be formed on the emission end face side of the base 30, just like Example 4 described above.

EXAMPLE 6

Figure 12A:
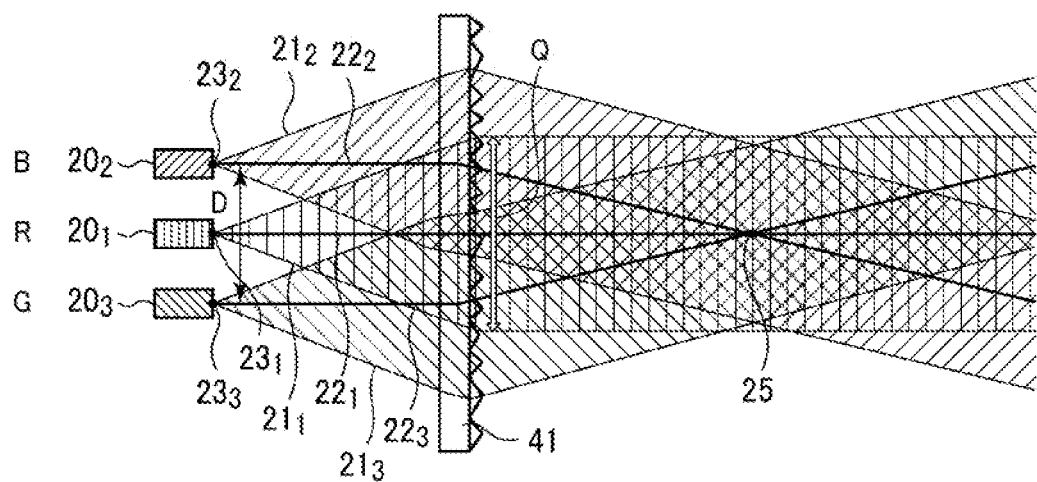
FIGS. 12A and 12B indicates schematic configuration diagrams of the light beam emission device of Example 6 of the present invention.
Figure 12B:
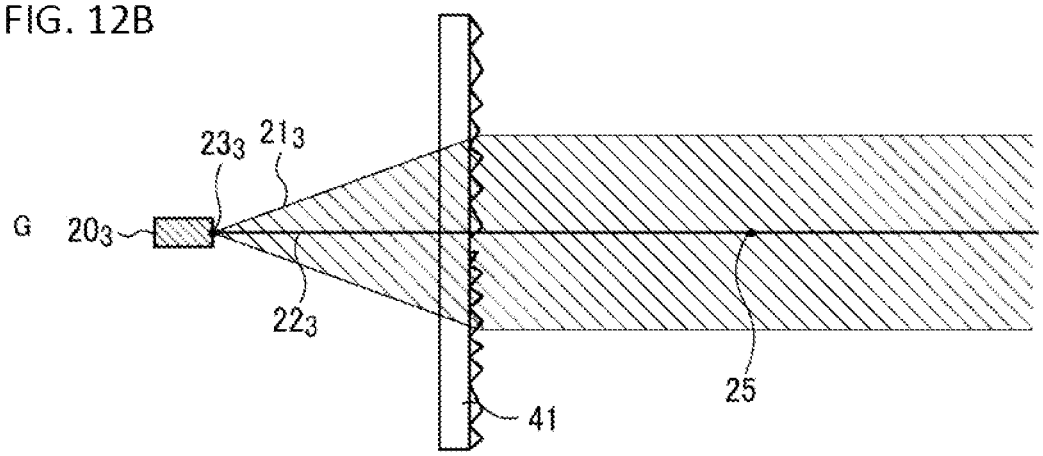

A light beam emission device of Example 6 of the present invention will be described with reference to FIGS. 12A and 12B. FIGS. 12A and 12B indicate schematic configuration diagrams of the light beam emission device of Example 6 of the present invention, where FIG. 12A is a plan view and FIG. 123 is a side view. Example 6 is the same as Example 1 described above, except that a holographic lens 41 is used for the condensing member.

EXAMPLE 7

Figure 13:
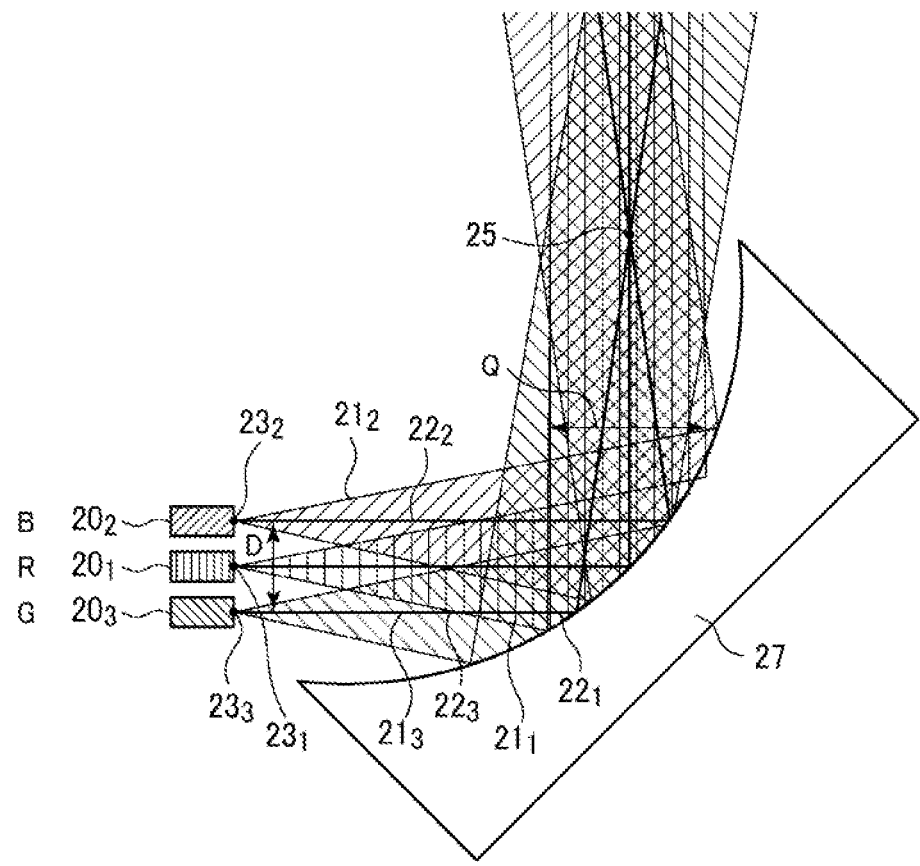
FIG. 13 is a schematic plan view of the light beam emission device of Example 7 of the present invention.

A light beam emission device of Example 7 of the present invention will be described with reference to FIG. 13. FIG. 13 is a schematic plan view of the light beam emission device of Example 7 of the present invention, and is the same as Example 1 described above, except that a condensing concave mirror is used instead of the condensing lens for the condensing member.

A shape of a surface of a concave mirror of the condensing concave mirror 27 is formed such that the light track $22_1$ of the center axis of the light emitted from the emission spot $23_1$ of the red semiconductor laser $20_1$ is reflected sideways at a right angle, and the light track $22_3$ of the center axis of the light emitted from the emission spot $23_3$ of the green semiconductor laser $20_3$ and the light track $22_2$ of the center axis of the light emitted from the emission spot $23_2$ of the blue semiconductor laser $20_2$ are reflected by the condensing concave mirror 27, then intersect at the convergent point 25. In this arrangement, the distance of the light track $22_1$ of the center axis of the light emitted from the emission spot $23_1$ of the red semiconductor laser $20_1$, to reach the concave mirror surface of the condensing concave mirror 27, is 2.3 mm. After the light track $22_1$ of the center axis of the light emitted from the emission spot $23_1$ of the red semiconductor laser $20_1$ is reflected sideways at a right angle, the distance between the reflection surface and the convergent point 25 is 3.4 mm. In other words, the optical path length between the emission spot $23_1$ of the red semiconductor laser $20_1$ and the convergent point 25 is 5.7 mm (=2.3 mm+3.4 mm). In this case, the light beams $21_1$ to $21_3$, reflected by the condensing concave mirror 27, are all collimate beams.

In Example 7 of the present invention, a compact 9 mm long light beam emission device that reflects the light beams sideways for can be acquired, and a high definition projection device can be implemented by using this light beam emission device. Furthermore, by using the condensing concave mirror for the condensing member, the problem of chromatic aberration, caused by using a lens, can be solved.

EXAMPLE 8

Figure 14:
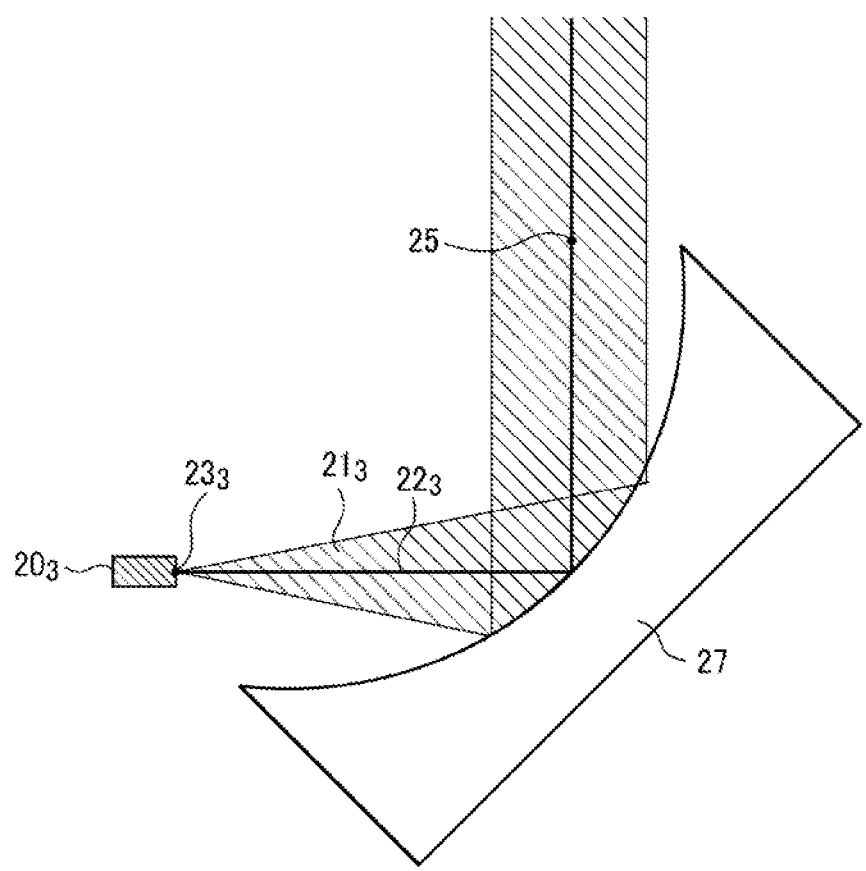
FIG. 14 is a schematic side view of the light beam emission device of Example 8 of the present invention.

A light beam emission device of Example 8 of the present invention will be described with reference to FIG. 14. FIG. 14 is a schematic side view of the light beam emission device of Example 8 of the present invention, and is the same as Example 7 described above, except that the light beams are reflected upward, and the convergent point 25 is acquired at an upward location. In the case of Example 8, a 9 mm long compact light beam emission device, that reflects light beams upward, can be acquired, and a high definition projection device can be implemented by using this light beam emission device.

EXAMPLE 9

Figure 15:
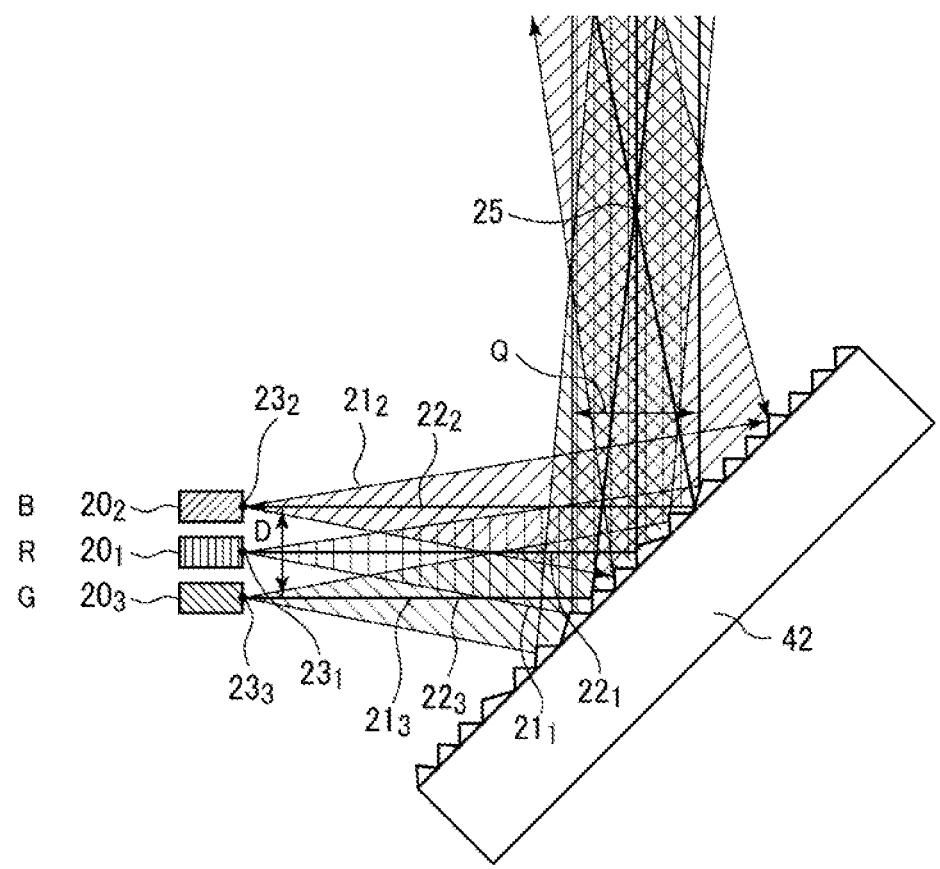
FIG. 15 is a schematic plan view of the light beam emission device of Example 9 of the present invention.

A light beam emission device of Example 9 of the present invention will be described with reference to FIG. 15. FIG. 15 is a schematic plan view of the light beam emission device of Example 9 of the present invention, and is the same as Example 7 described above, except that a holographic reflector 42 is used instead of the condensing concave mirror for the reflection member. In the case of Example 9 as well, a compact 9 mm long light beam emission device, that reflects light beams sideways, can be acquired, and a high definition projection device can be implemented by using this light beam emission device.

EXAMPLE 10

Figure 16:
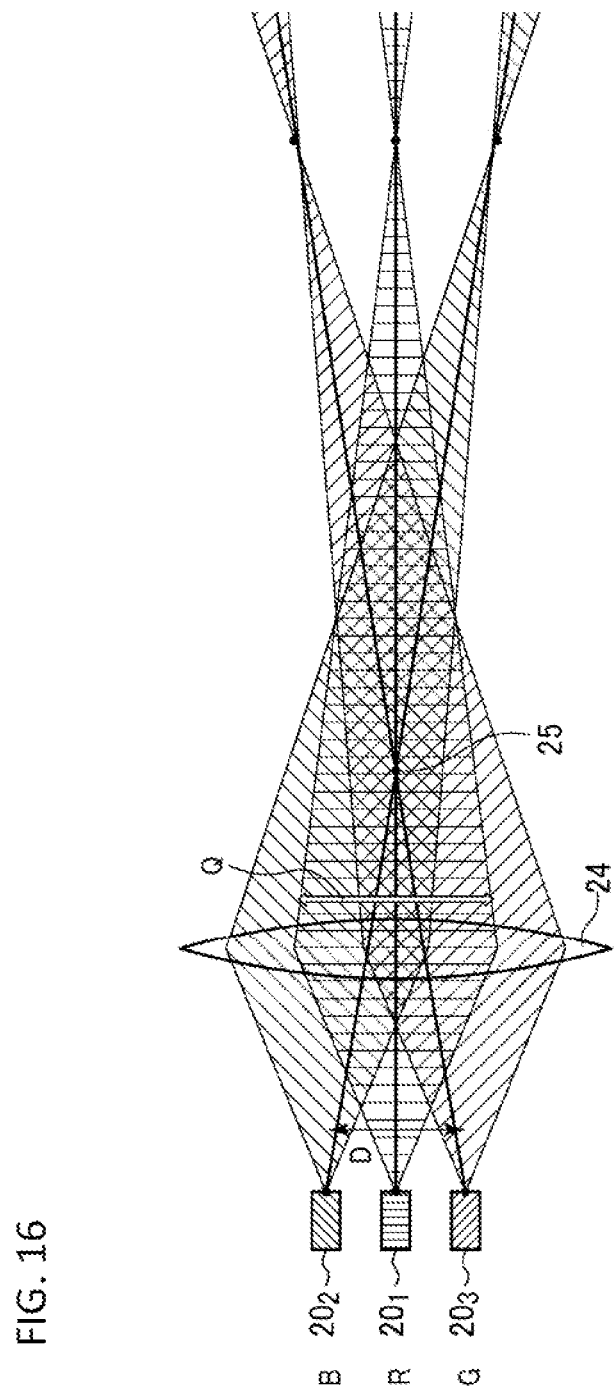
FIG. 16 is a schematic configuration diagram of the light beam emission device of Example 10 of the present invention.

A light beam emission device of Example 10 of the present invention will be described with reference to FIG. 16. FIG. 16 is a schematic configuration diagram of the light beam emission device of Example 10 of the present invention. In Example 10, instead of the collimated light beams, the light beams are condensed at a position ahead of the condensing lens 24, and the distance between the center of the condensing lens 24 and the condensing point is 10 cm for all the light sources ($20_1$ to $20_3$). The rest of the configuration is the same as Example 1. The distance between the light source ($20_1$ to $20_3$) and the condensing lens 24 is larger than the distance in the case of Example 1.

In Example 10 of the present invention, a compact 10 mm long light beam emission device (10 mm long) can be acquired, and a high definition projection device can be implemented by using this light beam emission device.

EXAMPLE 11

Figure 17:
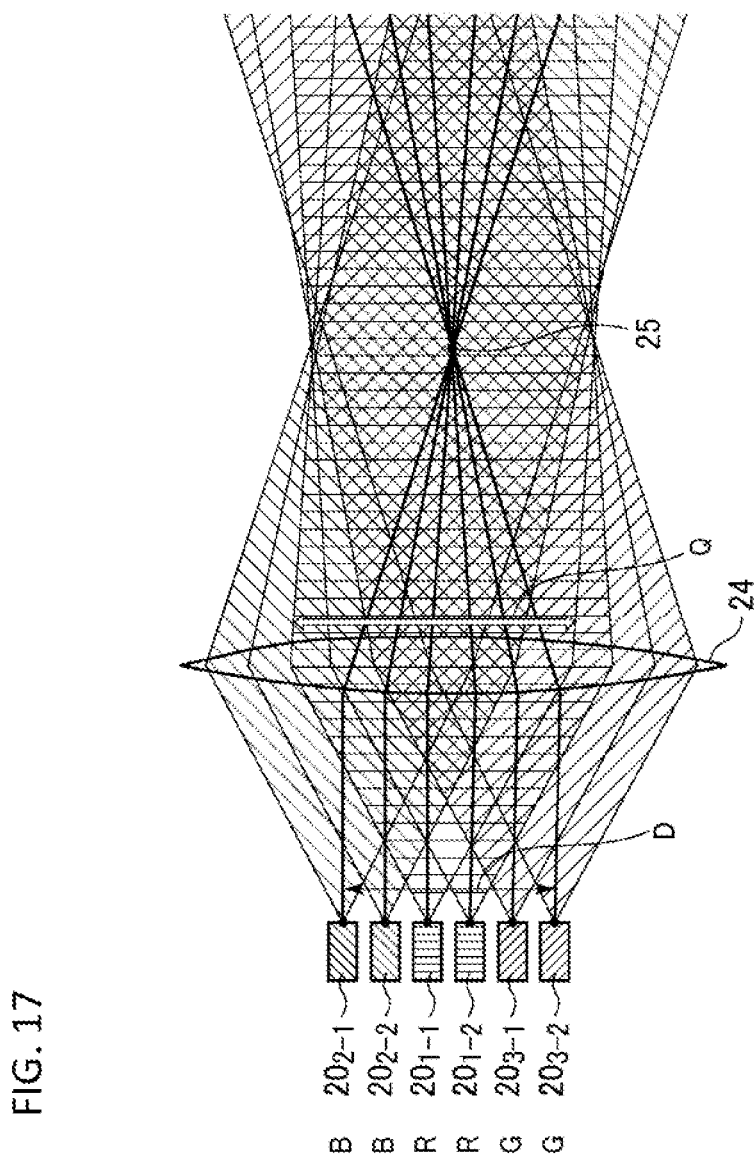
FIG. 17 is a schematic configuration diagram of the light beam emission device of Example 11 of the present invention.

A light beam emission device of Example 11 of the present invention will be described with reference to FIG. 17. FIG. 17 is a schematic configuration diagram of the light beam emission device of Example 11 of the present invention. Example 11 is the same as Example 1 described above, except that a number of light sources is 6.

Two red semiconductor lasers $20_{1-1}$ and $20_{1-2}$ of which emission wavelength is 635 nm, two blue semiconductor lasers $20_{2-1}$ and $20_{2-2}$ of which emission wavelength is 450 nm, and two green semiconductor lasers $20_{3-1}$ and $20_{3-2}$ of which emission wavelength is 520 nm are disposed in parallel at 0.15 mm intervals. In this case too, a range D of the emission spots in the element array direction from the blue semiconductor laser $20_{2-1}$ and the green semiconductor laser $20_{3-2}$ which are disposed at both ends, is within a beam range Q (light beam range from the red semiconductor laser $20_{1-1}$ in the lateral direction: 1 mm) immediately after the light beam from the red semiconductor laser $20_{1-1}$ disposed closest to the center of the condensing lens 24, passed through the condensing lens 24. The disposition may be any sequence, such as the sequence blue, red, green, blue, red and green from the condensing lens 24 side.

In Example 11 of the present invention, six semiconductor lasers can be disposed easily since a multiplexer is not used, and therefore, a light beam of which intensity is double the case of Example 1 can be acquired, hence a high brightness beam projection device can be implemented.

EXAMPLE 12

A light beam emission device of Example 12 of the present invention will be described with reference to FIG. 18. FIG. 18 is a schematic configuration diagram of the light beam emission device of Example 12 of the present invention. Example 12 is the same as Example 1 described above, except that a number of light sources is five since infrared and ultraviolet light sources are added.

The red semiconductor laser $20_1$ of which emission wavelength is 635 nm, the blue semiconductor laser $20_2$ of which emission wavelength is 450 nm, the green semiconductor laser $20_3$ of which emission wavelength is 520 nm, an infrared semiconductor laser $20_4$ of which emission wavelength is 830 nm, and an ultraviolet semiconductor laser $20_5$ of which emission wavelength is 375 nm are sequentially disposed in parallel at 0.15 mm intervals. In this case too, a range D in the element array direction from the emission spot $23_1$ of the red semiconductor laser $20_1$ and the emission spot $23_5$ of the ultraviolet semiconductor laser $20_5$, which are disposed at both ends, is within a beam range Q immediately after the light beam from the green semiconductor laser $20_3$ which passed through the condensing lens 24. The disposition may be any sequence, and it does not matter which semiconductor laser is disposed at the center of the condensing lens 24.

In Example 12 of the present invention, the multiplexer is not used, and five semiconductor lasers of which emission wavelengths are different are used, hence compared with the case of Example 1, a compact light beam projection device, including multiplexed light beams in a wide range of wavelengths regions, from infrared to ultraviolet, can be implemented.

EXAMPLE 13

A light beam projection device of Example 13 of the present invention will be described with reference to FIG. 19. FIG. 19 is a schematic configuration diagram of the light beam projection device of Example 13 of the present invention. In Example 13, the center of a mirror surface of a movable mirror unit 29 of an MEMS mirror device 28 is disposed at the convergent point 25 of the light beam projection device of Example 1, and the mirror surface is 45° tilted from the light track $22_3$ of the center axis of the light beam $21_3$ emitted from the green semiconductor laser $20_3$.

The size (chip size) of the MEMS mirror device 28 is 7 mm (length)×5 mm (width)×0.7 mm (height). The size of the movable mirror unit 29 of the MEMS mirror device 28 is 1 mmφ. For the MEMS mirror device 28, Si is used for the substrate, and an Al film is used for the material of the movable mirror unit 29.

By driving this movable mirror unit 29 by a piezoelectric drive method at a maximum drive voltage ±15 V, two-dimensional optical scanning is performed with a high-speed (horizontal) axis drive frequency of 35 KHz, a high-speed (horizontal) axis swing angle ±15° (mirror deflection angle), a low-speed (vertical) axis drive frequency of 60 Hz, and a low-speed (vertical) axis swing angle ±15° (mirror deflection angle). Here the piezoelectric drive method based on the piezoelectric effect is used, but a drive device based on an electrostatic drive method or an electromagnetic drive method may be used.

By the light beam projection device of Example 13 of the present invention, the 720P specification (1280×720 pixels) on high definition projection devices can be implemented. Here the MEMS mirror device that can perform two-dimensional optical scanning is used, but an image may be acquired by using two standalone MEMS mirror devices that can perform one-dimensional scanning, not two-dimensional scanning.

EXAMPLE 14

Figure 20A:
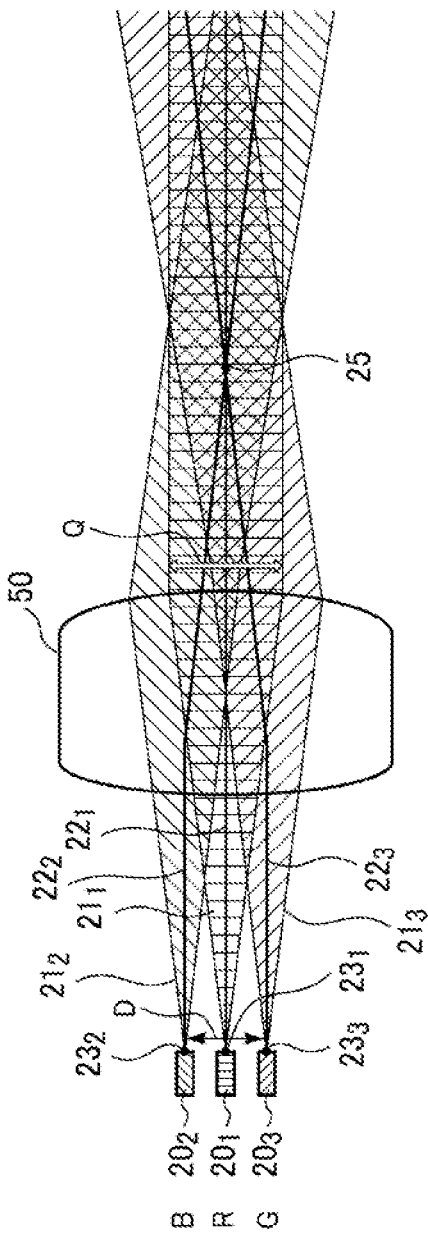
FIGS. 20A and 20B indicate schematic configuration diagrams of the light beam emission device of Example 14 of the present invention.
Figure 20B:
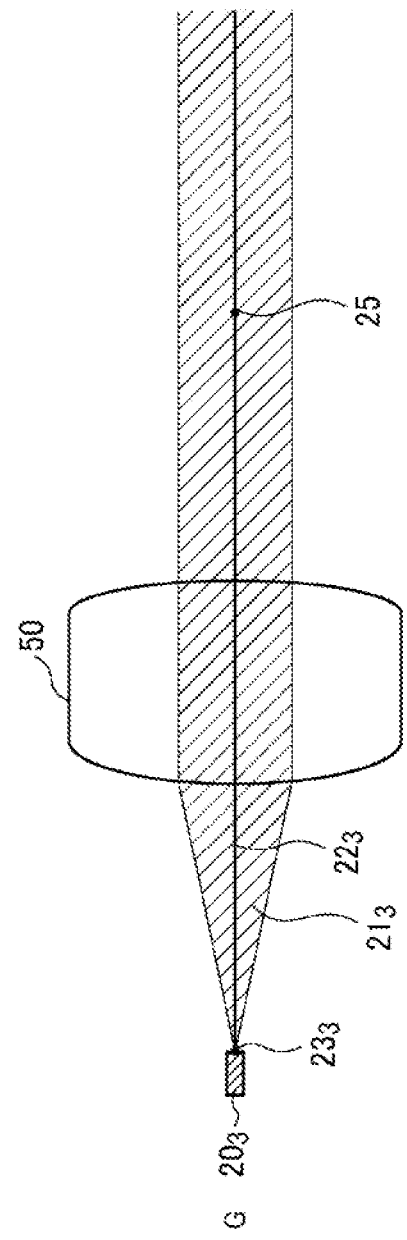

A light beam emission device of Example 14 of the present invention will be described with reference to FIGS. 20A and 20B. FIGS. 20A and 20B indicate schematic configuration diagrams of the light beam emission device of Example 14 of the present invention, where FIG. 20A is a top view and FIG. 20B is a side view. The basic configuration is the same as Example 1 described above, except that a condensing lens 50 having a free form surface is used for the condensing lens.

The red semiconductor laser 20 of which emission wavelength is 635 nm, the blue semiconductor laser $20_2$ of which emission wavelength is 450 nm, and the green semiconductor laser $20_3$ of which emission wavelength is 520 nm, are disposed in parallel at 0.2 mm intervals, and here the cross-sectional shape of the light beam emitted from each light source is an ellipse. In the case where the cross-section of the light beam that is emitted is an anisotropic shape, a lens, that can correct the cross-sectional shape of the light beam after passing the lens to be an isotropic shape, is used for the condensing lens 50 having a free form surface.

The light tracks $22_1$ to $22_3$ of the center axes of the light beams intersect at the convergent point 25. At this time, a range D in the light source array direction, where emission spots of the light beams $21_1$ to $21_3$ emitted from the red semiconductor laser 20 to the green semiconductor laser $20_3$ exist, is within a size Q in the light source array direction of the beam immediately after the light beam $21_2$, emitted from the emission spot $23_1$ at the center, passed through the condensing lens 50 having a free form surface.

In Example 14 of the present invention, the condensing lens having the free form surface is used for the condensing lens, hence in the case where the cross-sectional shape of the light beam emitted from each light source is an ellipse, the cross-sectional shape can be corrected to an isotropic shape (circle). At the same time, color irregularity and the like of the projected image can be improved, and a good projected image can be acquired. Even in a case where the emission angle of the light beam from each light source is different in the longitudinal direction and in the lateral direction, the light beam can be transformed to a light beam of which cross-sectional shape is a relatively good circle.

EXAMPLE 15

Figure 21A:
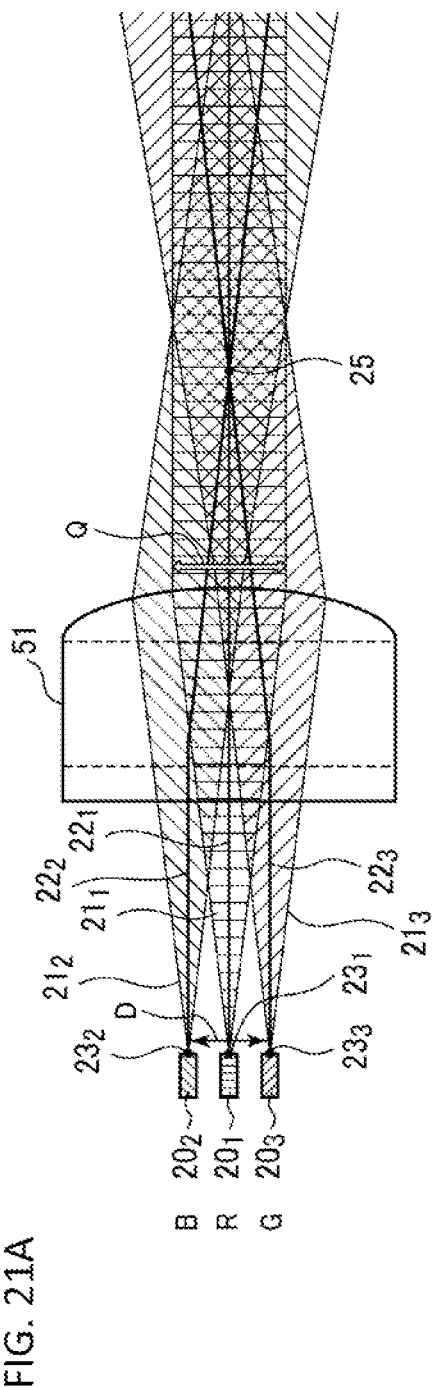
FIGS. 21A and 21B indicate schematic configuration diagrams of the light beam emission device of Example 15 of the present invention.
Figure 21B:
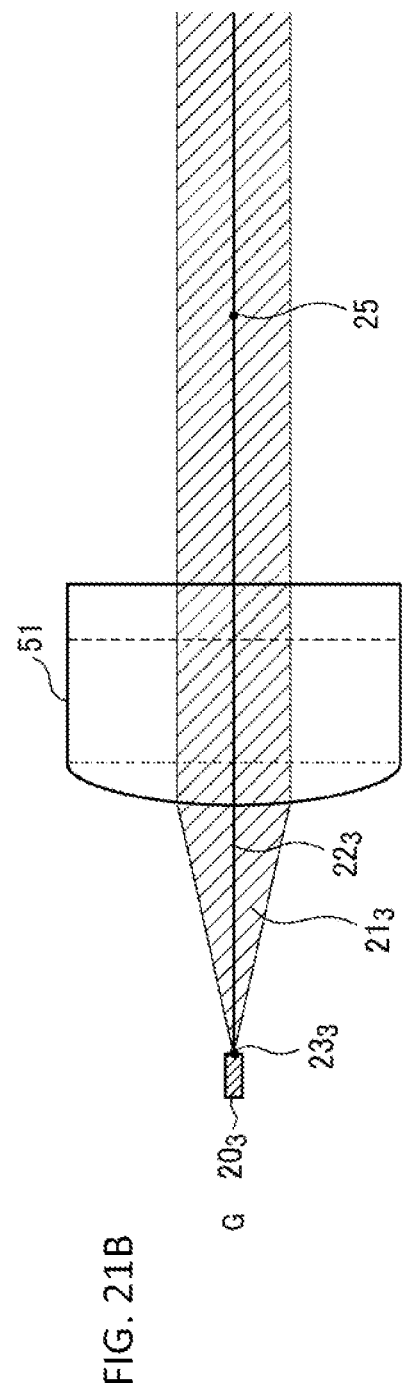

A light beam emission device of Example 15 of the present invention will be described with reference to FIG. 21A to FIG. 22B. FIGS. 21A and 21B indicate schematic configuration diagrams of the light beam emission device of Example 15 of the present invention, where FIG. 21A is a top view and FIG. 21B is a side view. The basic configuration is the same as Example 14 described above, except that condensing lens, having a cylindrical lens surfaces of which condensing directions are orthogonal, is used for the condensing lens. FIGS. 22A and 22B indicate explanatory diagrams of an optical configuration of the light beam emission device of Example 15 of the present invention, where FIG. 22A is a top view and FIG. 22B is a side view, The red semiconductor laser $20_1$ of which emission wavelength is 635 nm, the blue semiconductor laser $20_2$ of which emission wavelength is 450 nm, and the green semiconductor laser $20_3$ of which emission wavelength is 520 nm, are disposed in parallel at 0.2 mm intervals. In this case, the cross-sectional shape of the emitted beam from each semiconductor laser is an ellipse which is longer in the height direction, and the spread angle thereof is 20° in the height (longitudinal) direction, and is 10° in the lateral direction. The spread angle is defined as a $1/e^2$ total width of the beam. $1/e^2$ total width is a diameter for the optical power to become $1/e^2$ (e: Napier's constant) from a value on the center axis when the emission beam from each semiconductor laser is approximated to a Gaussian beam.

As illustrated in the top view in FIG. 21A and in the side view in FIG. 21B, the condensing lens 51 having cylindrical lens surfaces, of which condensing directions are orthogonal, is formed such that the surface of the lens on the light source side is cylindrical in the lateral direction, and the surface of the lens on the convergent point 25 side is cylindrical in the longitudinal direction. The cross-sectional shape of the emitted beam from each semiconductor laser is an ellipse that is longer in the height direction, hence the direction of the cylindrical surface on the light source side is orthogonal to the major axis of the elliptic cross-section of the emitted beam from the light source, and the direction of the cylindrical surface on the convergent point 25 side is orthogonal to the minor axis of the elliptic cross-section of the emitted beam.

The light beams $21_1$ to $21_3$ emitted from each semiconductor laser travel toward the condensing lens 51 having the cylindrical surfaces of which condensing directions are orthogonal, while spreading. Then the light beams $21_1$ to $21_3$ are condensed by the condensing lens 51 having the cylindrical lens surfaces of which condensing directions are orthogonal, and after passing through the condensing lens 51 having the cylindrical lens surfaces of which condensing directions are orthogonal, the light beams $21_1$ to $21_3$ travel as collimated light beams so that the light tracks $22_1$ to $22_3$ of the center axes of the lights emitted from the respective light sources intersect at the convergent point 25. The diameter of the collimate beam in this case is approximately 1 mmφ.

At this time, a range D in the light source array direction, where emission spots of the light beams $21_1$ to $21_3$ emitted from the red semiconductor laser $20_1$ to the green semiconductor laser $20_3$ exist, is within a size Q (1 mm) in the light source array direction of the beam immediately after the light beam $21_2$, emitted from the emission spot $23_1$ at the center, passed through the condensing lens 51 having the cylindrical lens surfaces of which condensing directions are orthogonal.

Further, the total of the angles in the lateral direction corresponding to the dead spaces of the image is at least smaller than the spread angel in the lateral direction of the light beam emitted from the light source, hence adjustment of the timings of the video signals become significantly easier. As a result, a compact light beam emission device is acquired, and a high definition projection device equipped therewith can be implemented. In the condensing lens 51 having the cylindrical lens surfaces of which condensing directions are orthogonal described above, the cylindrical lens surfaces are basically cylindrical shapes, and light is condensed only in either the longitudinal direction or in the lateral direction, but a curved surface may also be used in a direction orthogonal, so that the corrective condensing effect is acquired. Furthermore, the focal distance may be changed depending on the location by changing the curvature of the cylindrical shape in the longitudinal direction of the cylinder, so as to add correction to the condensing effect. The cross-sectional structure of the cylindrical lens surface may be a pseudo-cylindrical shape (e.g. toroidal surface), instead of the simple cylindrical shape.

The condensing lens described above is constituted of the condensing surface on the incident side and the condensing surface on the emission side, but a condensing element having the condensing surface on the incident side and a condensing element having the condensing surface on the emission side may be fabricated separately, or these elements may be integrated to one lens. In this case, an air layer may exist between the two condensing elements.

Next an optical configuration in the case of using the condensing lens 51 having cylindrical lens surfaces of which condensing directions are orthogonal, for the light beam emitted from the semiconductor laser $20_1$ at the center, will be described with reference to FIGS. 22A and 22B. The cross-sectional shape of the emission beam of the semiconductor laser $20_1$ is an ellipse which is longer in the light direction, and the spread angle thereof is 20° in the height direction (longitudinal) direction and is 10° in the lateral direction, and hence, the lens surface closer to the light source has a 2.8 mm focal distance $F_{front}$, and the lens surface more distant from the light source has a 5.7 mm focal distance $F_{rear}$. As a result, the light beam after passing through the lens has an approximately 1 mm diameter for both the height (longitudinal) direction and the lateral direction, that is, a collimated light beam of which cross-sectional shape is circular, is acquired. For the semiconductor lasers $20_2$ and $20_3$ which are not at the center too, D<Q is established, and similar collimated light beams of which cross-sectional shapes are circular are acquired.

EXAMPLE 16

A light beam emission device of Example 16 of the present invention will be described with reference to FIGS. 23A and 23B. FIGS. 23A and 23B indicate schematic configuration diagrams of the light beam emission device of Example 16 of the present invention, where FIG. 23A is a top view and FIG. 23B is a side view. The basic configuration is the same as Example 14 described above, except that a condensing lens 52, having a cylindrical lens surface and a convex lens surface, is used for the condensing lens.

The red semiconductor laser $20_1$ of which emission wavelength is 635 nm, the blue semiconductor laser $20_2$ of which emission wavelength is 450 nm, and the green semiconductor laser $20_3$ of which emission wavelength is 520 nm, are disposed in parallel at 0.2 mm intervals. In this case, the cross-sectional shape of the emitted beam from each semiconductor laser is an ellipse which is longer in the height direction, and the spread angle thereof is 20° in the height direction (longitudinal) direction and is 10° in the lateral direction.

As illustrated in the top view in FIG. 21A and in the side view in FIG. 21B, the condensing lens 52 having the cylindrical lens surface and the convex lens surface is formed such that the surface of the lens on the light source side is cylindrical in the lateral direction, and the surface of the lens on the convergent point 25 side is a convex lens. The cross-sectional shape of the emitted beam from each semiconductor laser is an ellipse that is longer in the height direction, hence the direction of the cylindrical surface on the light source side is orthogonal to the major axis of the elliptic cross-section of the emitted beam from the light source, and the direction of the cylindrical surface on the convergent point 25 side is orthogonal to the minor axis of the elliptic cross-section of the emitted beam.

The lens surface closer to the light source has a 2.8 mm focal distance $F_{front}$, and the lens surface more distant from the light source has a 5.7 mm focal distance $F_{rear}$. The light beams $21_1$ to $21_3$ emitted from each semiconductor laser travel toward the condensing lens 52 having the cylindrical lens surface and the convex lens surface, while spreading. Then the light beams $21_1$ to $21_3$ are condensed by the condensing lens 52 having the cylindrical lens surface and the convex lens surface, and after passing through the condensing lens 52 having the cylindrical lens surface and the convex lens surface, the light beams $21_1$ to $21_3$ travel as collimated light beams so that the light tracks $22_1$ to $22_3$ of the center axes of the lights emitted from the respective light sources intersect at the convergent point 25. The diameter of the collimated beam in this case is approximately 1 mmφ. In this case, the lens surface more distant from the light source has a shape of a convex lens, hence achromatic aberration is generated in the emitted light beam, but image projection is not influenced much thereby.

The cylindrical lens surface is basically a cylindrical shape, and light is condensed only in either the longitudinal direction or the lateral direction, but a curved surface may also be used in a direction orthogonal, so that the corrective condensing effect is acquired. Furthermore, the focal distance may be changed depending on the location by changing the curvature or the like of the cylindrical shape in the longitudinal direction of the cylinder, so as to add correction to the condensing effect. The cross-sectional structure of the cylindrical lens surface may be a pseudo-cylindrical shape (e.g. toroidal surface) instead of the simple cylindrical shape. This aspect is also the same for the convex lens surface, and an aspherical lens may be used. The condensing lens described above is constituted of the condensing surface on the incident side and the condensing surface on the emission side, but a condensing element having the condensing surface on the incident side and a condensing element having the condensing surface on the emission side may be fabricated separately and integrated to one lens. In this case, an air layer may exist between the two condensing elements.

Example 14 to Example 16 described above are the cases of the transmission type condensing lens, but the same description is also applicable to the case of the reflection type illustrated in FIG. 13, the holographic lens illustrated in FIGS. 12A and 12B, and the holographic reflector illustrated in FIG. 15. In other words, in the case of the reflection type, if the emitted light beam from the semiconductor laser is an ellipse, the elliptical shape of the cross-section of the light beam can be shaped closer to a circle by making the focal distance of the reflection mirror on the major axis side of the ellipse to be shorter than the focal distance of the reflection mirror on the minor axis side of the ellipse. In the cases of the holographic lens and the holographic reflector as well, if the emitted light beam from the semiconductor laser is an ellipse, the elliptical shape of the cross-section of the light beam can be shaped closer to a circle by making the focal distance of the lens or the reflector on the major axis side of the ellipse to be shorter than the focal distance of the lens or the reflector on the minor axis side of the ellipse.

EXAMPLE 17

Figure 24A:
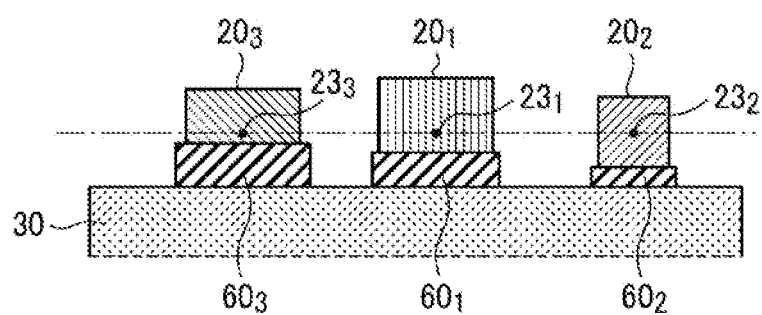
FIGS. 24A to 24C indicate schematic configuration diagrams of the light beam emission device of Example 17 of the present invention.
Figure 24B:
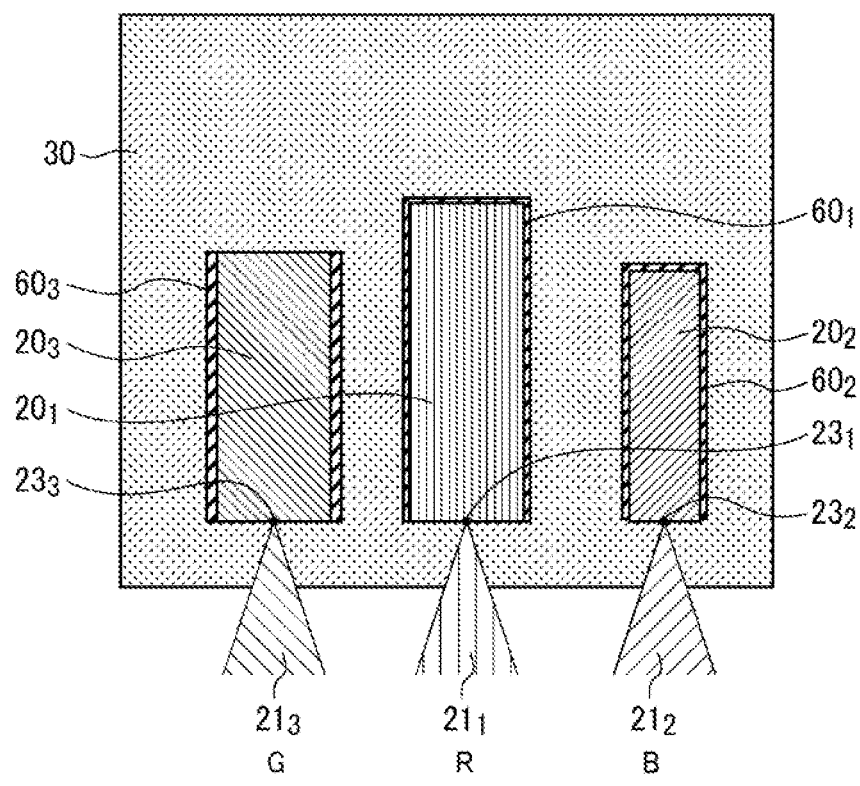
Figure 24C:
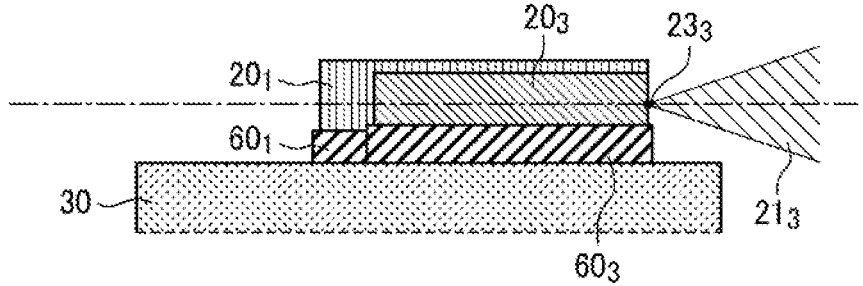

A light beam emission device of Example 17 of the present invention will be described with reference to FIGS. 24A to 24C. FIGS. 24A to 24C indicate schematic configuration diagrams of the light beam emission device of Example 17 of the present invention, where FIG. 24A is a front view, FIG. 24B is a top view, and FIG. 24C is a side view. In Example 17, each light source is installed on a flat base $30$ (fundamental base) via secondary bases $60_1$, $60_2$ and $60_3$ of which heights are different, so that the difference of the heights of the centers of the emission spots $23_1$ to $23_3$ of the semiconductor lasers $20_1$ to $20_3$ become within $\Delta h$. The rest of the configuration is the same as Example 3. Illustration of the condensing lens is omitted here.

In this case, a material of the base $30$ to be the fundamental base is preferably a semiconductor (e.g. Si) or a metal (e.g. CuW) because conductivity of heat emitted from the semiconductor laser is high. For the secondary bases $60_1$, $60_2$ and $60_3$, $SiO_2$, with which heights can be easily adjusted in the semiconductor process, is preferable, but any dielectric, semiconductor and metal material may be used if the difference of the heights can be kept within $\Delta h$. The secondary bases $60_1$, $60_2$ and $60_3$ are structured such that the entire surface of each semiconductor laser is supported respectively.

Here for the base $30$ to be the fundamental base, a 1 mm thick Si substrate is used. For the secondary bases $60_1$, $60_2$ and $60_3$, $SiO_2$ film is formed by a sputtering method, and then selective gas-phase etching is performed using an etching mask formed by a contact exposure method. On the secondary bases $60_1$, $60_2$ and $60_3$ formed like this, the red semiconductor laser $20_1$, the blue semiconductor laser $20_2$ and the green semiconductor laser $20_3$ are mounted so that the emission spots $23_1$ to $23_3$ thereof are aligned. The heights of the secondary bases $60_1$, $60_2$ and $60_3$ may be the same as long as the heights of the centers of the emission spots $23_1$ to $23_3$ of the semiconductor lasers $20_1$ to $20_3$ from the lower surface of each semiconductor laser are all within $\Delta h$. If the fundamental base and the secondary bases are formed of a same semiconductor material, Si in particular, then the fabrication process to fabricate the bases becomes simple. This fabrication process is as follows.

(1) First, a heat resistant mask is formed on a region of the secondary bases on the Si substrate.

(2) Then an oxide film having a thickness corresponding to the height of the secondary bases is formed on the entire Si substrate by thermal oxidation or hydrothermal oxidation.

(3) Then the oxide film is removed by a hydrofluoric acid type etchant, and then the mask is removed.

(4) In the case of forming secondary bases of which heights are different, this thermal oxidation process using a mask is repeated. If thermal oxidation is used, the thickness of the oxide film can be easily controlled, hence the secondary bases of which heights are accurately controlled can be formed. In this case, the Si substrate becomes the fundamental base.

EXAMPLE 18

A light beam emission device of Example 18 of the present invention will be described with reference to FIGS. 25A to 25C. FIGS. 25A to 25C indicate schematic configuration diagrams of the light beam emission device of Example 18 of the present invention, where FIG. 25A is a front view, FIG. 25B is a top view, and FIG. 25C is a side view. In Example 18, each light source is installed on the flat base $30$ (fundamental base) via a secondary base $61_1$ ($61_2$, $61_3$) of which height is different, so that the difference of heights of the centers of the emission spots $23_1$ ($23_2$, $23_3$) of the semiconductor lasers $20_1$ ($20_2$, $20_3$) becomes within $\Delta h$. Here only the configuration related to the red semiconductor laser $20_1$, disposed at the center, is illustrated. Illustration of the condensing lens is omitted here too. In Example 18, the secondary base $61_1$ ($61_2$, $61_3$) has a structure that supports only both sides of each semiconductor laser $20_1$ ($20_2$, $20_3$). The rest of the configuration is the same as Example 17.

EXAMPLE 19

Figure 26A:
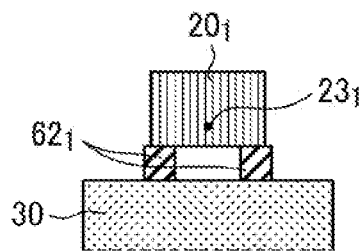
FIGS. 26A to 26C indicate schematic configuration diagrams of the light beam emission device of Example 18 of the present invention.
Figure 26B:
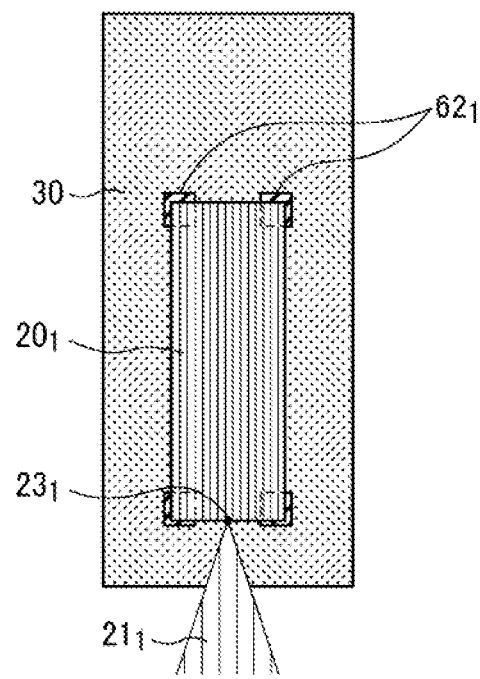
Figure 26C:
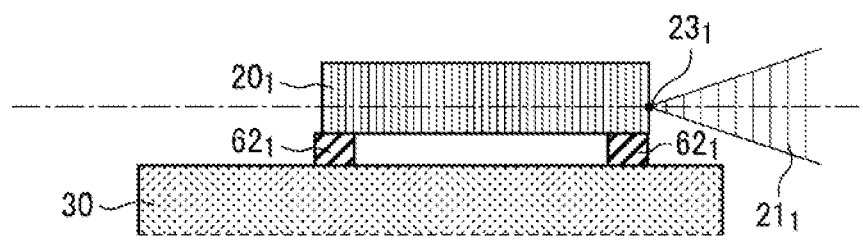

A light beam emission device of Example 19 of the present invention will be described with reference to FIGS. 26A to 26C. FIGS. 26A to 26C indicate schematic configuration diagrams of the light beam emission device of Example 18 of the present invention, where FIG. 26A is a front view, FIG. 26B is a top view, and FIG. 26C is a side view. In Example 19, each light source is installed on the flat base $30$ (fundamental base) via a secondary base $62_1$ ($62_2$, $62_3$) of which height is different, so that the difference of heights of the centers of the emission spots $23_1$ ($23_2$, $23_3$) of the semiconductor lasers $20_1$ ($20_2$, $20_3$) becomes within $\Delta h$. Here only the configuration related to the red semiconductor laser $20_1$, disposed at the center, is illustrated. Illustration of the condensing lens is omitted here too. In Example 19, the secondary base $62_1$ ($62_2$, $62_3$) has a structure that supports only four corners of each semiconductor laser $20_1$ ($20_2$, $20_3$). The rest of the configuration is the same as Example 17.

EXAMPLE 20

Figure 27:
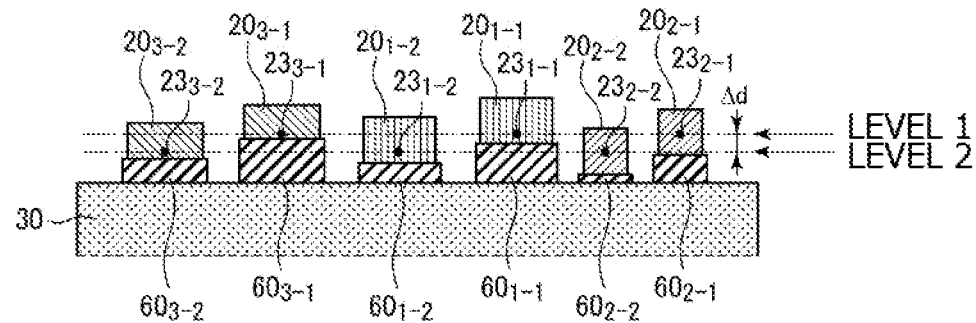
FIG. 27 is a front view of the light beam emission device of Example 20 of the present invention.
Figure 28:
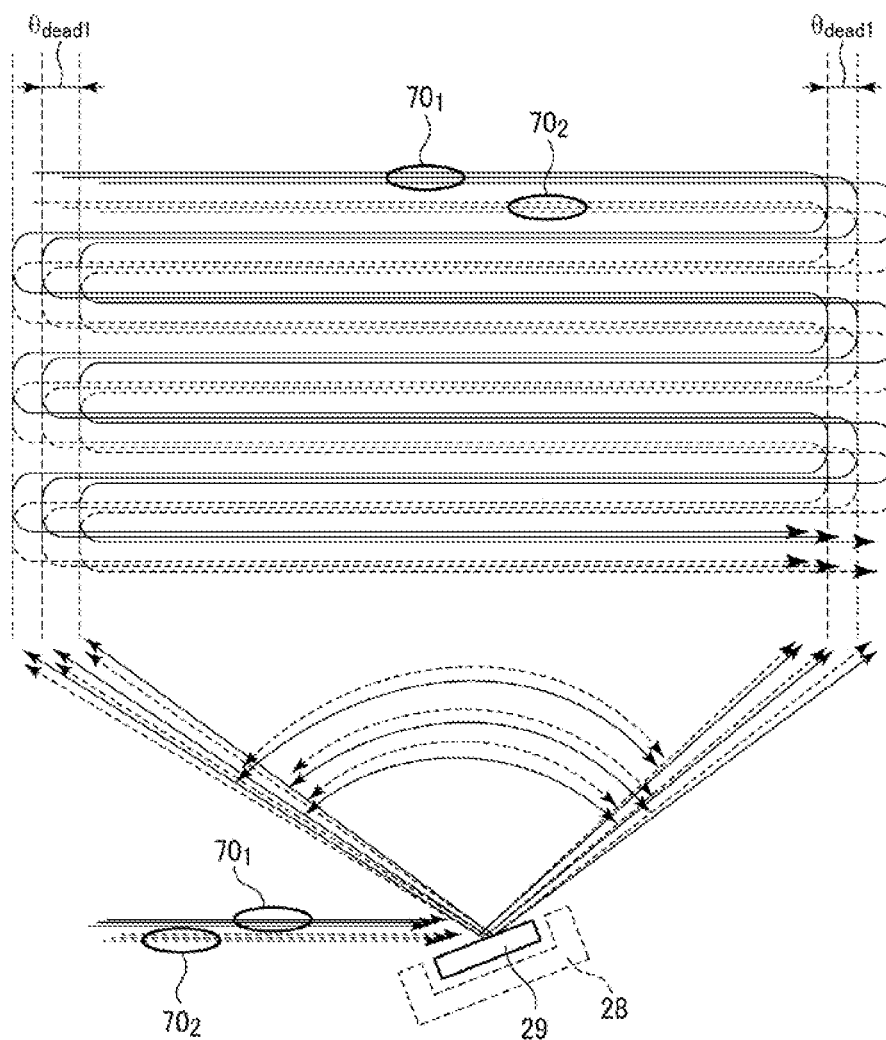
FIG. 28 is a diagram for explaining each dead space of a scanned image according to Example 20 of the present invention.
Figure 29:
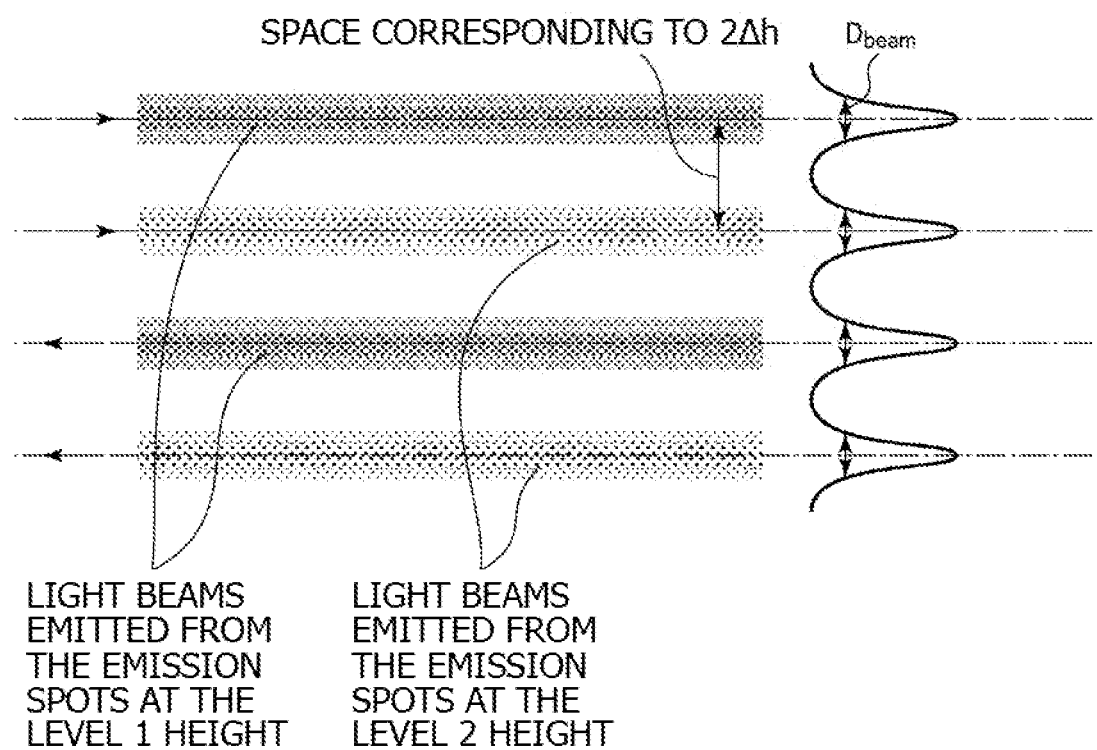
FIG. 29 is a conceptual diagram of a raster scan in a case of forming an image by sweeping the light beam back and forth according to Example 20 of the present invention.

A light beam emission device of Example 20 of the present invention will be described with reference to FIG. 27 to FIG. 29. FIG. 27 is a front view of the light beam emission device of Example 20 of the present invention, FIG. 28 is a diagram for explaining each dead space of a scanned image according to Example 20 of the present invention, and FIG. 29 is a conceptual diagram of a raster scan in a case of forming an image by sweeping the light beam back and forth according to Example 20 of the present invention. As illustrated in FIG. 27, two sets of six secondary bases $60_{1\text{-}1}$, $60_{1\text{-}2}$, $60_{2\text{-}1}$, $60_{2\text{-}2}$, $60_{3\text{-}1}$ and $60_{3\text{-}2}$, of which heights are different, are disposed for each color. Here illustrations of the top view, the side view and the condensing lens are omitted.

As illustrated in FIG. 27, the heights of the centers of the emission spots $23_{1\text{-}1}$ to $23_{3\text{-}1}$ are aligned at level 1, and the difference of the heights of the centers of the emission spots $23_{1\text{-}1}$ to $23_{3\text{-}1}$ is kept within $\Delta h$. Further, the heights of the centers of the emission spots $23_{1\text{-}2}$ to $23_{3\text{-}2}$ are aligned at level 2, and the difference of the heights of the centers of the emission spots $23_{1\text{-}2}$ to $23_{3\text{-}2}$ is kept within $\Delta h$. As described in FIG. 6, in an image that is raster scanned onto a screen or the like, $\Delta h$ is a value corresponding to ½ of the space between the closest scan lines used for the image generated by repeatedly scanning in the lateral direction, even if the number of semiconductor lasers are doubled, as illustrated in FIG. 29. In this case, the difference $\Delta d$ of the heights between level 1 and level 2 is set to be double $\Delta h$. This means that the space between the scan lines of the light beam emitted at level 1 or level 2 alone is four times $\Delta h$.

Thereby when scanning is performed with the light beams emitted from the emission spots $23_{1\text{-}1}$ to $23_{3\text{-}2}$ using the optical scanning mirror and a raster scan image is formed on a screen or the like (raster sweep with a lateral direction high-speed sweep and a height direction low-speed sweep, and the lateral direction sweep is in the array direction), a number of scan lines that are repeatedly scanned in the lateral direction, to generate the image, can be double the case of the emission spots $23_{1\text{-}1}$ to $23_{3\text{-}1}$ alone, or the emission spots $23_{1\text{-}2}$ to $23_{3\text{-}2}$ alone, if a number of sweeping is the same. As a result, compared with the case of using the semiconductor lasers $20_{1\text{-}1}$ to $20_{3\text{-}1}$ alone, the resolution in the low-speed sweep direction (height direction) becomes double if a number of times of a sweeping per unit time is the same. Further, a number of times of sweeping per unit time can be decreased by half if the resolution of the image is the same, and the load on the drive circuit can be reduced.

Next each dead space of the scanned image according to Example 20 of the present invention will be described with reference to FIG. 28. FIG. 28 is a conceptual diagram when scanning is performed by a MEMS mirror device 28 with three light beams emitted from the emission spots $23_{1\text{-}1}$ to $23_{3\text{-}1}$ at level 1 height, and with three light beams emitted from the emission spots $23_{1\text{-}2}$ to $23_{3\text{-}2}$ at level 2 height, and a raster scan image is acquired. The basic principle is the same as the case of FIG. 5. Compared with the case of using a single level, a number of scan lines here is doubled. The installation range of the semiconductor lasers in the lateral direction is limited so as to satisfy D<Q.

FIG. 29 is a conceptual diagram of a raster scan in the case of forming an image by sweeping back and forth according to Example 20 of the present invention, and the basic principle is the same as the case of FIG. 6. The scan lines $70_1$ generated by the three light beams emitted from the emission spots at the level 1 height and the scan lines $70_2$ generated by the three light beams emitted from the emission spots at the level 2 height are formed alternately. In the description of Example 20, the centers of the emission spots of the red, blue and green light sources are aligned at positions in two levels, but a number of scan lines may be further increased by setting more than two levels. In this case, the resolution can be further increased, or a number of times of sweeping per unit time can be further decreased.

The sequence of dispositions of the light sources in Example 1 to Example 20 described above is arbitrary. The sequence of disposition of the light sources described in each example is not fixed but is changeable.

REFERENCE SIGNS LIST

1, $1_1$ to $1_3$ Light source
2, $2_1$ to $2_3$ Light beam
3, $3_1$ to $3_3$ Emission spot
4, $4_1$ to $4_3$ Light track
5 Condensing member
6 Convergent point
$20_1$, $20_{1\text{-}1}$, $20_{1\text{-}2}$ Red semiconductor laser
$20_2$, $20_{2\text{-}1}$, $20_{2\text{-}2}$ Blue semiconductor laser
$20_3$, $20_{3\text{-}1}$, $20_{3\text{-}2}$ Green semiconductor laser
$20_4$ Infrared semiconductor laser
$20_5$ Ultraviolet semiconductor laser
$21_1$ to $21_5$ Light beam
$22_1$ to $22_5$ Light track
$23_1$ to $23_5$ Emission spot
24 Condensing lens
25 Convergent point
26 Focal point
27 Condensing concave mirror
28 MEMS mirror device
29 Movable mirror unit
30 Base
31 Si substrate
$32_1$ to $32_3$ Step
33 Step portion
41 Holographic lens
42 Holographic reflector
50 Condensing lens having free form surface
51 Condensing lens having cylindrical lens surfaces of which condensing directions are orthogonal
52 Condensing lens having cylindrical lens surface and convex lens surface
$60_1$, $60_{1\text{-}1}$, $60_{1\text{-}2}$, $60_2$, $60_{2\text{-}1}$, $60_{2\text{-}2}$, $60_3$, $60_{3\text{-}1}$, $60_{3\text{-}2}$, $61_1$, $62_1$ Secondary base
$70_1$ Scan lines generated by three light beams emitted from emission spots at level 1 height
$70_2$ Scan lines generated by three light beams emitted from emission spots at level 2 height

The invention claimed is:

1. A light beam emission device comprising:
a plurality of light sources; and
a condensing member, wherein
a range in the light source array direction, in which emission spots of light beams emitted from the plurality of light sources respectively exist, is within a size in the array direction of a light beam, the size being a beam diameter immediately after the light beam emitted from the emission spot located most closely to the center of the plurality of light sources, with respect to the condensing member, passed through the condensing member.

2. The light beam emission device according to claim 1, wherein in an image acquired by raster-scanning with the light beam, a range of emission spots of the light beams emitted from the plurality of light sources respectively in the vertical direction of the array direction is smaller than ½ of a space between adjacent scan lines in the lateral direction, which are used for generating an image and are acquired by scanning with the light beam in the array direction of the light sources.

3. The light beam emission device according to claim 1, wherein
the plurality of light sources are disposed on a base on which steps corresponding to the plurality of light sources are provided.

4. The light beam emission device according to claim 3, wherein
the base is constituted of a fundamental base on which a region to dispose the plurality of light sources is flat, and secondary bases which are disposed on the fundamental base and has heights corresponding to the plurality of light sources respectively.

5. The light beam emission device according to claim 3, wherein
the plurality of light sources, of which emission spots of the light sources are grouped into two or more levels, are disposed on the base.

6. The light beam emission device according to claim 5, wherein
the light beams emitted from the plurality of light sources, which are grouped into two or more levels and disposed on the base, are a red beam, a blue beam and a green beam respectively for each level.

7. The light beam emission device according to claim 1, wherein
the condensing member is a transmission type condensing lens.

8. The light beam emission device according to claim 7, wherein
the transmission type condensing lens has an effect of converting a cross-sectional shape of the light beam emitted from each of the plurality of light sources, so that the cross-sectional shape of the light beam after transmission becomes a circle.

9. The light beam emission device according to claim 8, wherein
the transmission type condensing lens, which has the effect of converting an elliptical cross-sectional shape of a light beam emitted from each of the plurality of light sources into a circular shape, is a condensing lens having cylindrical lens surfaces of which condensing directions are orthogonal.

10. The light beam emission device according to claim 8, wherein
the transmission type condensing lens, which has the effect of converting an elliptical cross-sectional shape of a light beam emitted from each of the plurality of light sources into a circular shape, is a condensing lens having a cylindrical lens surface and a convex lens surface.

11. The light beam emission device according to claim 7, wherein
a distance between a center of the condensing lens and a convergent point at which the light beams intersect is smaller than the focal distance of the condensing lens.

12. The light beam emission device according to claim 7, wherein
chromatic aberration caused by a difference of wavelengths of the light beams emitted from the plurality of light sources, is corrected by changing the positions of the emission spots of the light beams emitted from the plurality of light sources in the light traveling direction and emission directions of the light beams, and the light sources are disposed so that all the light beams intersect at one convergent point.

13. The light beam emission device according to claim 1, wherein
the condensing member is a reflection mirror.

14. The light beam emission device according to claim 1, wherein
the condensing member is either a holographic lens for light condensing or a holographic reflector.

15. The light beam emission device according to claim 1, wherein
the light beam is a collimated laser beam, or a condensing laser beam that is condensed at a position ahead of the condensing member.

16. The light beam emission device according to claim 1, wherein
the light source is either a semiconductor laser or a light-emitting diode.

17. The light beam emission device according to claim 1, wherein
the light beams are a red beam, a green beam and a blue beam.

18. A light beam projection device comprising:
the light beam emission device according to claim 1; and
a reflection mirror that is disposed at a convergent point of the light beams from the light beam emission device and is capable of performing optical scanning.

* * * * *